(12) United States Patent
Padhi et al.

(10) Patent No.: US 9,136,540 B2
(45) Date of Patent: *Sep. 15, 2015

(54) METAL AIR CATHODE MANGANESE OXIDE CONTAINED IN OCTAHEDRAL MOLECULAR SIEVE

(75) Inventors: Akshaya Kumar Padhi, Madison, WI (US); Denis D. Carpenter, Verona, WI (US); Jeffrey A. Poirier, Madison, WI (US)

(73) Assignee: SPECTRUM BRANDS, INC., Madison, WI (US)

( * ) Notice: Subject to any disclaimer, the term of this patent is extended or adjusted under 35 U.S.C. 154(b) by 1046 days.

This patent is subject to a terminal disclaimer.

(21) Appl. No.: 12/870,959

(22) Filed: Aug. 30, 2010

(65) Prior Publication Data

US 2011/0070487 A1 Mar. 24, 2011

Related U.S. Application Data

(63) Continuation-in-part of application No. 11/272,990, filed on Nov. 14, 2005, now Pat. No. 8,974,964.

(51) Int. Cl.
| | |
|---|---|
| *H01M 4/90* | (2006.01) |
| *C01G 45/02* | (2006.01) |
| *H01M 4/36* | (2006.01) |
| *H01M 4/62* | (2006.01) |
| *H01M 4/96* | (2006.01) |

(Continued)

(52) U.S. Cl.
CPC ............. *H01M 4/9016* (2013.01); *B01J 23/34* (2013.01); *B01J 23/8892* (2013.01); *B01J 35/1014* (2013.01); *C01G 45/02* (2013.01); *H01M 4/364* (2013.01); *H01M 4/623* (2013.01); *H01M 4/96* (2013.01); *H01M 12/06* (2013.01); *C01P 2002/54* (2013.01); *C01P 2002/72* (2013.01); *C01P 2004/41* (2013.01); *C01P 2006/10* (2013.01); *C01P 2006/12* (2013.01); *C01P 2006/40* (2013.01); *H01M 4/043* (2013.01); *H01M 4/0471* (2013.01); *H01M 4/50* (2013.01); *H01M 4/625* (2013.01); *H01M 10/24* (2013.01); *H01M 2300/0014* (2013.01); *H01M 2300/0085* (2013.01); *Y02E 60/50* (2013.01)

(58) Field of Classification Search
CPC ...... H01M 10/24; H01M 4/9016; H01M 4/24
See application file for complete search history.

(56) References Cited

U.S. PATENT DOCUMENTS

| | | |
|---|---|---|
| 3,336,145 A | 8/1967 | Purcell |
| 3,389,145 A | 6/1968 | Katz |

(Continued)

FOREIGN PATENT DOCUMENTS

| | | |
|---|---|---|
| WO | 0209580 A1 | 11/2002 |
| WO | 2007056775 A2 | 5/2007 |

OTHER PUBLICATIONS

Toupin et al., "Influence of Microstructure on the Charge Storage Properties of Chemically Synthesized Manganese Dioxide," Chem. Mater. 2002, 14, 3946-3952.*

(Continued)

*Primary Examiner* — Zachary Best
(74) *Attorney, Agent, or Firm* — Foley & Lardner LLP

(57) ABSTRACT

An oxygen reduction electrode, e.g., an air cathode, comprising manganese oxides having octahedral molecular sieve structures as active catalyst materials and use of such an electrode as a component of a metal-air cell.

17 Claims, 18 Drawing Sheets

(51) Int. Cl.
  *H01M 12/06* (2006.01)
  *B01J 23/889* (2006.01)
  *B01J 23/34* (2006.01)
  *B01J 35/10* (2006.01)
  *H01M 4/04* (2006.01)
  *H01M 4/50* (2010.01)
  *H01M 10/24* (2006.01)

(56) References Cited

U.S. PATENT DOCUMENTS

| | | | |
|---|---|---|---|
| 4,256,545 A * | 3/1981 | Deborski | 204/290.01 |
| 4,277,360 A | 7/1981 | Mellors et al. | |
| 4,477,541 A | 10/1984 | Fraioli | |
| 4,536,300 A | 8/1985 | Kayser et al. | |
| 4,595,643 A | 6/1986 | Koshiba et al. | |
| 4,758,374 A | 7/1988 | Durr, Jr. et al. | |
| 4,892,637 A | 1/1990 | Sauer et al. | |
| 4,975,346 A * | 12/1990 | Lecerf et al. | 429/331 |
| 5,149,854 A | 9/1992 | Nappier | |
| 5,166,012 A | 11/1992 | Rossouw et al. | |
| 5,308,711 A | 5/1994 | Passaniti et al. | |
| 5,378,562 A | 1/1995 | Passaniti et al. | |
| 5,407,500 A | 4/1995 | Forsberg et al. | |
| 5,597,944 A | 1/1997 | O'Young et al. | |
| 5,635,155 A | 6/1997 | O'Young et al. | |
| 5,695,618 A | 12/1997 | O'Young et al. | |
| 5,702,674 A | 12/1997 | O'Young et al. | |
| 5,705,078 A | 1/1998 | Kurek et al. | |
| 6,156,283 A | 12/2000 | Allen et al. | |
| 6,174,624 B1 | 1/2001 | Yano et al. | |
| 6,486,357 B2 | 11/2002 | Suib et al. | |
| 6,551,564 B1 | 4/2003 | Becue et al. | |
| 6,610,263 B2 | 8/2003 | Pahlman et al. | |
| 6,685,898 B2 | 2/2004 | Allen et al. | |
| 6,780,347 B2 | 8/2004 | Ndzebet | |
| 6,805,996 B2 | 10/2004 | Hosoya | |
| 6,808,847 B2 | 10/2004 | Wang et al. | |
| 6,841,302 B2 | 1/2005 | Anglin et al. | |
| 6,927,000 B2 | 8/2005 | Ndzebet | |
| 6,939,630 B2 | 9/2005 | Sotomura et al. | |
| 2002/0160251 A1 * | 10/2002 | Chang et al. | 429/42 |
| 2003/0049517 A1 * | 3/2003 | Hampden-Smith et al. | 429/44 |
| 2003/0129115 A1 | 7/2003 | Vaughey et al. | |
| 2003/0173548 A1 | 9/2003 | Ndzebet et al. | |
| 2003/0219368 A1 | 11/2003 | Hammel et al. | |
| 2004/0202938 A1 | 10/2004 | Noguchi et al. | |
| 2005/0026031 A1 | 2/2005 | McKenzie et al. | |
| 2007/0111095 A1 | 5/2007 | Padhi et al. | |
| 2011/0220842 A1 * | 9/2011 | Nanjundaswamy et al. | 252/182.1 |

OTHER PUBLICATIONS

Extended European Search Report in European Application No. 11250735.5-2119 (Dec. 5, 2011).

Extended European Search Report in European Application No. 06848418.7-2119, dated Feb. 29, 2012.

De Guzman et al., "Synthesis and Characterization of Octahedral Molecular Sieves (OMS-2) Having the Hollandite Structure," Chemistry of Materials 6(6): 815-821 (1994).

Giovanoli et al., "A New Synthesis of Hollandite. A Possibility for Immobilization of Nuclear Waste," Chimia, 35(2):53-55 (1981).

Malone et al., "Freeform Fabrication of Zinc-air Batteries and Electrochemical Assemblies," Rapid Prototyping Journal, 10(1): 58-69 (2004).

Miller et al., "Electrocatalysis in Hydrogen Peroxide Fuel Cells," Proceedings of the First International Conference on Green Propellants for Space Propulsion and 4th Annual Hydrogen Peroxide Propulsion Conference, Jun. 20-22, 2001, European Space Agency, Noordwijk, The Netherlands.

Schumm et al., Manganese Dioxide Symposium, Electrochemical Society, vol. 2, Tokyo, Japan 1980, pp. 99-102.

Zhang et al., "MnO2/MCMB Electrocatalyst for all Solid-State Alkaline Zinc-Air Cells," Electrochimica Acta, 49(6): 873-877 (2004).

Zhou et al., "Studies of Decomposition of H2O2 Over Manganese Oxide Octahedral Molecular Sieve Materials," Journal of Catalysis, 176(2): 321-328 (1998).

International Search Report and Written Opinion issued in PCT/US06/60818, dated Sep. 11, 2007.

Final Office action issued in U.S. Appl. No. 11/272,990 (Mar. 1, 2011).

Non-final Office Action cited in U.S. Appl. No. 11/272,990 (Sep. 30, 2013).

Final Office Action on U.S. Appl. No. 11/272,990, mailed May 22, 2014.

Final Office Action on U.S. Appl. No. 11/272,990, mailed May 4, 2010.

Final Office Action on U.S. Appl. No. 11/272,990, mailed Jun. 3, 2009.

Non-Final Office Action on U.S. Appl. No. 11/272,990, mailed Nov. 10, 2009.

Non-Final Office Action on U.S. Appl. No. 11/272,990, mailed Aug. 4, 2014.

Non-Final Office Action on U.S. Appl. No. 11/272,990, mailed Nov. 10, 2008.

Toupin et al., "Influence of Microstructure on the Charge Storage Properties of Chemically Synthesized Manganese Dioxide," Chem. Mater. 2002, 14, 3946-3952.

Notice of Allowance on U.S. Appl. No. 11/272,990, mailed Dec. 4, 2014.

* cited by examiner

500 °C

550 °C

600 °C

METAL AIR CATHODE MANGANESE OXIDE CONTAINED IN OCTAHEDRAL MOLECULAR SIEVE

CROSS REFERENCE TO RELATED APPLICATIONS

This application is a continuation-in-part application of U.S. patent application Ser. No. 11/272,990 which was filed on Nov. 14, 2005 and titled "NOVEL METAL AIR CATHODE: MANGANESE OXIDE CONTAINED IN OCTAHEDRAL MOLECULAR SIEVE", the contents of which are incorporated by reference in their entirety.

FIELD OF THE INVENTION

The present invention relates generally to electrochemical cells such as batteries. More particularly, the present invention relates to an oxygen reduction electrode, e.g., an air cathode, comprising manganese oxide contained in an octahedral molecular sieve structure as an active catalyst material and use of such an electrode as a component of a metal-air cell.

BACKGROUND OF THE INVENTION

Among the various metal oxide catalyst materials for use as cathode components in metal-air cells, manganese oxide catalysts have been investigated due to their low cost and high catalytic activity for oxygen reduction. Manganese can exhibit a number of different oxidation states. Due to the stability of these oxidation states, including 2+, 3+ and 4+, a single composition may contain a stable mixture of a variety of different oxides such as, e.g., $MnO_2$, $Mn_2O_3$, $Mn_3O_4$, and $MnO$. The use of manganese oxides, in a variety of oxidation states, as an active catalyst material of a cathode has been reported. See U.S. Pat. No. 4,595,643 (Koshiba et al.) and U.S. Pat. No. 4,892,637 (Sauer et al).

Manganese oxides when used in electrochemical cells have presented several challenges as active catalyst materials. Chief among those challenges is limited catalytic activity. Higher voltage in the metal-air cell depends upon rapid oxygen reduction at the cathode. Such oxygen reduction kinetics, being catalyst limited, allow the cells to be used for low or moderate power applications, such as hearing aids for users with moderate hearing loss, but limits their use in more demanding high power applications.

Foremost among the factors causing polarization in cells employing manganese oxides as active catalyst material is the buildup of peroxides at the electrode due to slow reaction kinetics of both reduction of peroxides to hydroxyl ions and decomposition of peroxides to water and oxygen at the cathode. During manganese oxide catalyzed reduction of oxygen, peroxides, which form upon oxygen reduction, may either decompose into water and adsorbed oxygen or undergo additional reduction to hydroxyl ions, the desired redox reaction. Slow or wasteful decomposition inhibits the desired reduction reaction from peroxides to hydroxyl ions, which can lower the voltage produced by conventional metal air cells.

Manganese oxide contained in an octahedral molecular sieve structure is an efficient catalyst for the decomposition of hydrogen peroxide. See Zhou et al., *Journal of Catalysis*, 176, 321-328 (1998). A catalyst which efficiently removes hydrogen peroxide may be advantageous because the peroxide is an intermediate in the reduction path of oxygen to hydroxyl ions. This advantage allows the cell voltage to better reflect the full potential of the oxygen reduction half cell reaction for a given current density, thus resulting in a high power cathode. Recently, manganese oxides contained in an octahedral molecular sieve structure such as the hollandite structure have been explored because of their high catalytic activity for peroxide reduction. Zhang and Zhang describe an all solid-state galvanic cell having a cathode comprising nanostructured $MnO_2$/mesocarbon microbeads (MCMB), a compacted zinc anode made from Zn powder and a PTFE binder, and a polymer gel electrolyte comprising a potassium salt of poly (acrylic acid). See "$MnO_2$/MCMB electrocatalyst for all solid-state alkaline zinc-air cells," *Electrochemica Acta*, 49 (2004) 873-877. The composition of the $MnO_2$ component of the $MnO_2$/MCMB cathode is said to have been $KMn_8O_{16}$ and the authors report that XRD analysis indicated that it had a hollandite structure. In preparation of the cathode, a 4:1 wt./wt. $MnO_x$/MCMB composite was synthesized by preparing a suspension of MCMB (specific surface area=3.5 $m^2/g$) and a solution of $MnSO_4 \cdot H_2O$ in distilled water. $K_2S_2O_8$ was added and the mixture refluxed until the pH decreased to about 0.5. The cathode of Zhang and Zhang was tested under idealized conditions, such that its practical use in a commercial battery is difficult to determine, i.e., the cathode was tested in a flooded half-cell and in the presence of a large excess of KOH electrolytic solution.

SUMMARY OF THE INVENTION

The present disclosure is directed to an electrochemical cell comprising an anode, an aqueous alkaline electrolytic solution and an oxygen reduction electrode. The oxygen reduction electrode comprises a mixed manganese oxide catalyst comprising an octahedral molecular sieve structure and $Mn_2O_3$, wherein the octahedral molecular sieve structure and the $Mn_2O_3$ are present in the mixed catalyst in a ratio between about 1:9 and about 9:1.

The present disclosure is also directed to an electrochemical cell comprising an anode, an aqueous alkaline electrolytic solution and an oxygen reduction electrode. The oxygen reduction electrode comprises a mixed manganese oxide catalyst comprising an octahedral molecular sieve structure and $Mn_2O_3$, wherein the manganese in the mixed catalyst has an average oxidation state of less than about 3.7.

Other aspects of this invention will be in part apparent and in part pointed out hereinafter.

DESCRIPTION OF THE PREFERRED EMBODIMENTS

In accordance with this invention, a mixed manganese oxide comprising an octahedral molecular sieve structure and $Mn_2O_3$ serves as an oxygen reduction catalyst in a novel oxygen reduction electrode (i.e., cathode). The cathode of the present invention has application in a wide variety of electrochemical cells. It is especially advantageous in galvanic cells, such as in metal-air cells, and more specifically, in a zinc-air cell. Metal-air cells comprising the novel cathode may usefully be constructed as button cells for the various applications in which this type of cell has been found attractive. It shall be understood, however, that the present invention has application to electrochemical cells other than button cells. For example, the cathode active material of the present invention may find application in any metal air cell using flat, bent, or cylindrical electrodes. Among the cylindrical metal-air cells, the cathode active material is applicable to those shaped for AA, AAA, AAAA, C, and D cells.

Metal-Air Cells

Figure 1:
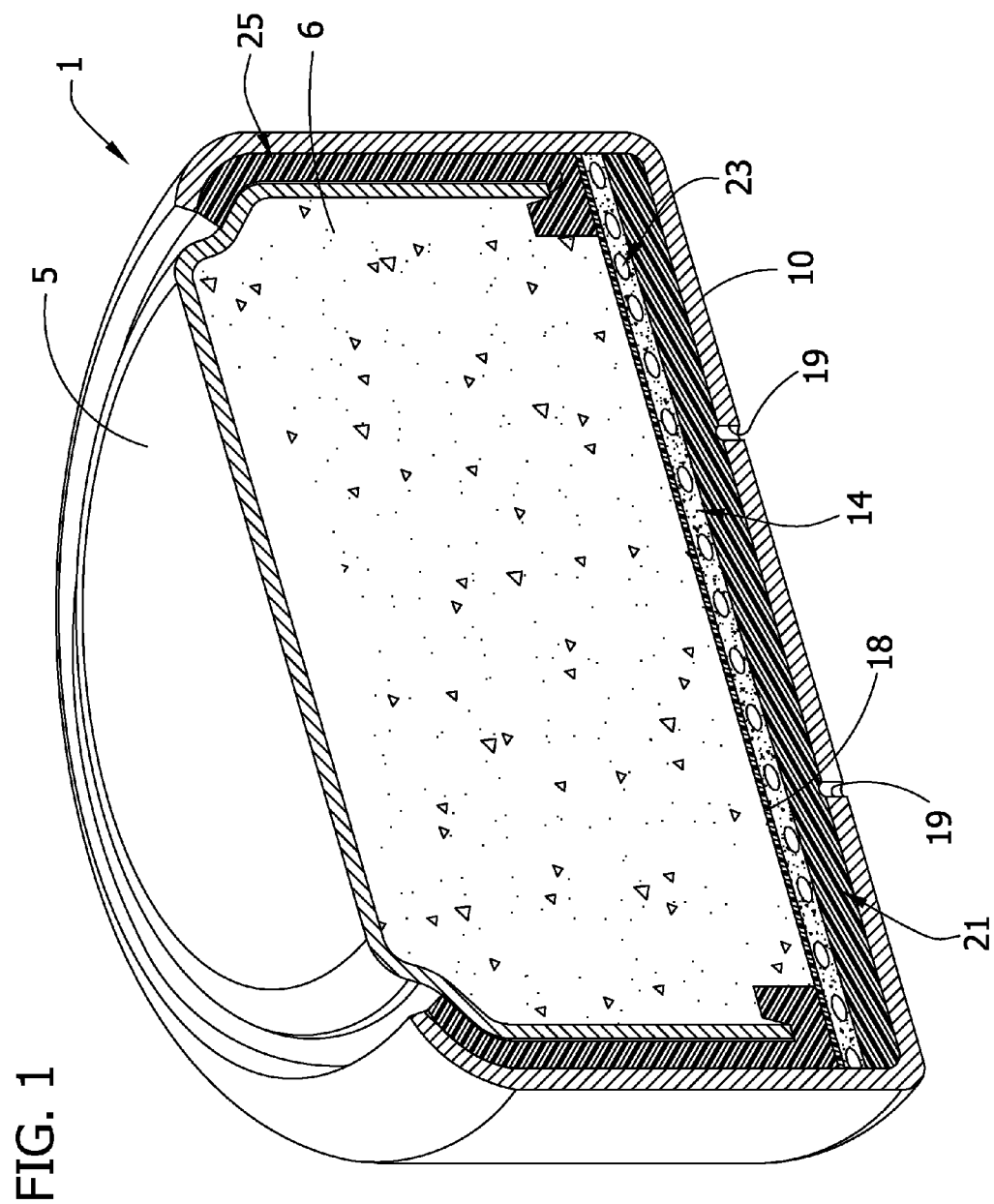
FIG. 1 is a cross-section of a conventional metal-air cell.

Referring now to FIG. 1, a cross-section of a metal-air cell 1 is shown. The cell comprises an electrically conductive anode can 5 received in an electrically conductive cathode can 10. A generally cylindrical or annular thin-walled dielectric grommet 25 (also referred to as a gasket or seal) electrically insulates the anode can 5 from direct electrical contact with the cathode can 10 and forms a seal therebetween to close the reactive materials within the cell 1.

Anode material 6, which comprises active metal, typically present as a powder, and an ionically conductive, preferably gelled, electrolytic solution are contained within the anode can 5 in electrical contact therewith. The anode, which is referred to as the negative terminal, is the site of oxidation. Preferably, the anode material comprises an electropositive material such as zinc, lithium, or aluminum metal. Preferably, the ionically conductive electrolytic solution is an aqueous gel comprising alkaline salt, such as potassium hydroxide, sodium hydroxide, or lithium hydroxide.

Air cathode material 14, which typically comprises a porous, highly conductive material, for example carbon powder, combined with one or more electrocatalytically active materials, conventionally manganese dioxide, is contained within the cathode can 10 in electrical contact therewith. According to the present invention, the electrocatalytically active material comprises a mixed manganese oxide comprising an octahedral molecular sieve structure and $Mn_2O_3$. The air cathode, which is referred to as the positive terminal, is the site of reduction. In a metal-air cell, the cathode can 10 comprises openings 19, which allow atmospheric oxygen to diffuse into the interior of the cathode can, through a diffusion layer 21, and come into electrical contact with the air cathode material 14, where the oxygen is reduced to hydroxyl ions. Oxidation of the anode material 6 provides electrons for the reduction of oxygen. The anode can and cathode can are electrically insulated by the dielectric grommet 25. Therefore, the electrical circuit may be completed through a wire (not shown), which may carry electrons through a load (not shown), from the anode can 5 to the cathode can 10. The cathode can 10 is in electrical contact with a current collector 23 which collects the electrons for the reduction of oxygen at the air cathode material 14. A separator 18, which is a permeable membrane or a porous film having electrolytic solution within the pores, allows the passage of hydroxyl ions from the air cathode material 14 into the ionically conductive electrolytic solution for transfer to the anode but otherwise prevents electrical contact between the air cathode material 14 and the anode material 6.

Zinc-Air Cells

A typical example of a metal-air cell is a zinc-air cell. In a zinc-air cell, the air cathode comprises an electrically conductive material which is air porous. This porosity allows oxygen, which has diffused through the openings in the cathode can, to come into electrical contact with the air cathode material, where it is reduced to hydroxyl ions. The half cell reaction is:

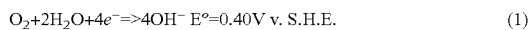

$$O_2+2H_2O+4e^- =>4OH^- \quad E°=0.40V \text{ v. S.H.E.} \quad (1)$$

Air cathodes may comprise active catalyst materials, hydrophobic polymeric binders, and carbon powders. The air cathode suitably comprises between about 0.1% and about 90% by mass manganese oxide active catalyst material, more suitably between about 10% and about 50%, still more suitably between about 25% and about 40%. The air cathode suitably comprises between about 1% and about 50% hydrophobic polymeric binder, more suitably between about 5% and about 30%, still more suitably between about 10% and about 25%.

Carbon powders are typically characterized as electrically conductive carbon powders and catalytically active powders. Characterizing a particular carbon powder as either electrically conductive or catalytically active is not meant to limit its utility in the cell. For example, it is known that electrically conductive carbon powders have some catalytic activity for oxygen reduction. It is also known that catalytically active carbon powders are also electrically conductive. Typical electrically conductive carbon powders include graphite, carbon black, and combinations thereof. In those embodiments where an electrically conductive carbon powder is present, the air cathode suitably comprises between about 1% and about 40% by mass electrically conductive carbon powder, more suitably between about 1% and about 15%, still more suitably between about 1% and about 5%. Catalytically active carbon powders include activated carbon. The air cathode suitably comprises between about 10% and about 90% by mass catalytically active carbon powders, more suitably between about 30% and about 85%, still more suitably about 50%. Activated carbon has been found to have catalytic activity for the oxygen and hydrogen peroxide reduction and oxygen adsorptive properties. Suitably, between about 20% and about 90%, more suitably between about 45% and about 80%, still more suitably between about 55% and about 75% and even more suitably between about 65% and about 75% by weight of all of the carbon powders (catalytic and conductive) have particle sizes smaller than 325 mesh. The carbon powders suitably have a total B.E.T. surface area between about 200 m²/g and about 2000 m²/g, more suitably between about 500 m²/g and about 1200 m²/g. Preferably, the carbon powders are porous. With particular regard to activated carbon powders, the activated carbon powders suitably have a B.E.T. surface area between about 900 m²/g and about 1200 m²/g, more suitably between about 1000 m²/g and about 1100 m²/g.

An exemplary manganese oxide compound which is catalytically active is described by Passaniti et al. See U.S. Pat. Nos. 5,308,711 and 5,378,562, both of which are hereby incorporated by reference in their entirety. In Passaniti et al., the inventors disclosed that PWA activated carbon introduced into an alkali metal permanganate solution would cause a reaction at room temperature which forms insoluble, catalytically active manganese oxide compounds. The activated carbon reduces the permanganate to catalytically active manganese oxide compounds. It was discovered that electrodes comprising activated carbon and the catalytically active manganese oxide compounds operated at higher potentials over the full range of tested current densities as compared to electrodes comprising conventional catalysts. The catalytically active manganese oxide compounds may be obtained by contacting alkali metal permanganate with activated carbon in a weight ratio of alkali metal permanganate to carbon between about 0.01:1 and about 0.2:1, more suitably between about 0.02:1 and about 0.1:1, and even more suitably between about 0.04:1 and about 0.08:1. The resulting product, which comprises crystalline or amorphous manganese oxide on a carbon support, is an effective catalyst for the reduction of oxygen. Preferable sources of permanganate include alkali metal permanganate salts such as permanganate salts of lithium, sodium, and potassium.

According to the present invention, the air cathode comprises a mixed manganese oxide comprising an octahedral molecular sieve structure and $Mn_2O_3$ as a catalytically active material. Alternatively, the air cathode may comprise manganese oxide contained in an octahedral molecular sieve structure in combination with a manganese oxide compound in another form, such as, for example, the catalytically active manganese oxide compounds described by Passaniti et al. It has been found that manganese oxide contained in an octahedral molecular sieve structure has catalytic activity for the decomposition and reduction of peroxide, an intermediate in oxygen reduction. Octahedral molecular sieves encompass a class of oxides of metals characterized by a particular framework structure comprising $MO_6$ octahedra, wherein M represents a metal cation. M may be Mn, Fe, Ti, V, Zr, Sn, Pb, Ge, or Cr in some of the known octahedral molecular sieve structures. The framework structure comprises a particular arrangement of $MO_6$ octahedra forming atomic scale tunnels. For example, an octahedral molecular sieve comprises a framework of metal oxides contained in $MO_6$ octahedra linked at vertices and edges into a 2×2 arrangement forming atomic scale tunnels having dimensions of approximately 4.6 Å×4.6 Å. In another example, an octahedral molecular sieve comprises a framework of metal oxides contained in $MO_6$ octahedra linked at vertices and edges into a 3×3 arrangement forming atomic scale tunnels having dimensions of approximately 6.9 Å×6.9 Å. Other arrangements are known. See DeGuzman, Roberto N. et al., *Chem. Mater.* 1994, 6, 815-821 (the disclosure of which is hereby incorporated in its entirety).

Figure 2:
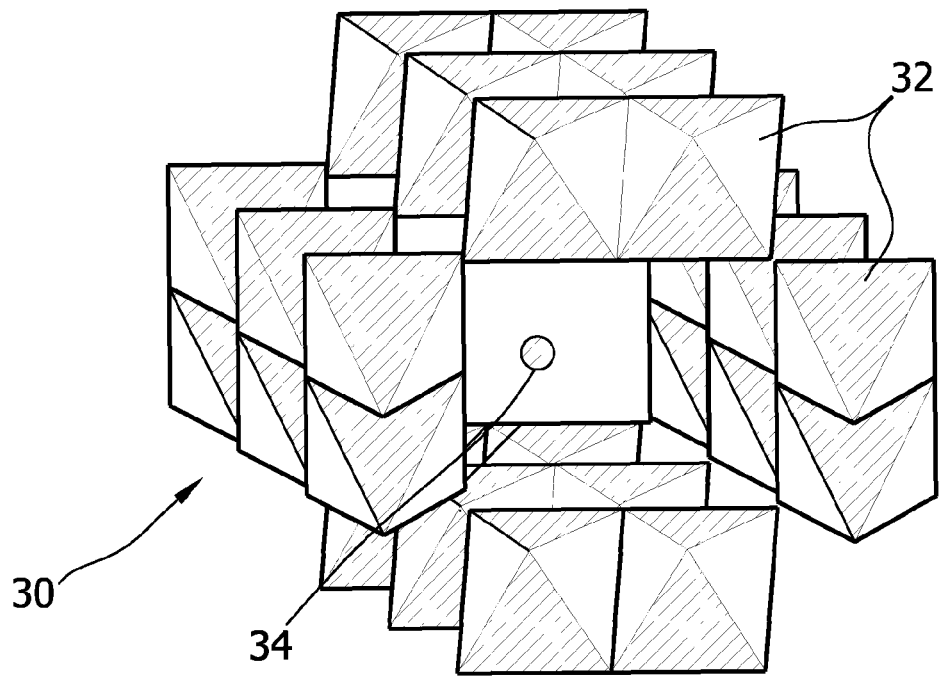
FIG. 2 is a schematic of the structure of manganese oxide contained in an octahedral molecular sieve structure with a metal cation residing in an atomic scale tunnel.

A manganese oxide contained in octahedral molecular sieve structure having a 2×2 arrangement of $MnO_6$ octahedra is depicted generally in FIG. 2. The octahedral molecular sieve 30 is characterized by atomic scale tunnels having dimensions of 4.6 Å×4.6 Å due to a particular framework of $MnO_6$ octahedra 32 linked at vertices and edges into a 2×2 arrangement. The $MnO_6$ octahedra, being in 2×2 framework, have an approximate stoichiometry of $Mn_8O_{16}$ surrounding each atomic scale tunnel. A metal cation 34, such as $K^+$, $Ba^{2+}$, $Pb^{2+}$, $Sr^{2+}$, $Cu^{2+}$, $Mg^{2+}$, $Fe^{3+}$, $Co^{2+}$, and $Ni^{2+}$, may reside in the atomic scale tunnels. Several manganese oxides contained in octahedral molecular sieve structures are known. For example, manganese oxides arranged in a 2×2 framework forming atomic scale tunnels in which $Ba^{2+}$ ions reside in the atomic scale tunnels are known as hollandites. Hollandite has an approximate stoichiometry of $Ba(Mn^{4+},Mn^{3+},Mn^{2+})_8O_{16}$. Where $Pb^{2+}$ ions reside in the atomic scale tunnels, the structure is known as coronadite. Coronadite has an approximate stoichiometry of $Pb(Mn^{4+},Mn^{3+},Mn^{2+})_8O_{16}$. Where $K^+$ ions reside in the atomic scale tunnels, the structure is known as cryptomelane. Cryptomelane has an approximate stoichiometry of $K(Mn^{4+},Mn^{3+},Mn^{2+})_8O_{16}$. Where $Sr^{2+}$ ions reside in the atomic scale tunnels, the structure is known as strontiomelane. Strontiomelane has an approximate stoichiometry of $Sr(Mn^{4+},Mn^{3+},Mn^{2+})O_{16}$. Manjiroite refers to a manganese oxide contained in an octahedral molecular sieve structure in which $K^+$ and $Na^+$ ions reside in the atomic scale tunnels. Manjiroite has an approximate stoichiometry of $Na,K(Mn^{4+},Mn^{3+},Mn^{2+})_8O_{16}$. In each of the above formulae, a composition can contain manganese in a variety of oxidation states.

Manganese oxide contained in an octahedral molecular sieve structure can be synthesized such that substantially no metal ions reside in the atomic scale tunnels immediately after a product is obtained, as in Example 1 of Lecerf et al. (U.S. Pat. No. 4,975,346). Exposure to a metal cation solution places metal cations into the unoccupied tunnels. Manganese oxide contained in an octahedral molecular sieve structure formed by this method may have the empirical formula:

$$M_Y MnO_Z$$

wherein M is a metal cation residing in the atomic scale tunnel. The metal cation may be $K^+$, $Ba^{2+}$, $Pb^{2+}$, $Sr^{2+}$, $Cu^{2+}$, $Mg^{2+}$, $Fe^{3+}$, $Co^{2+}$, and $Ni^{2+}$. Y reflects the proportion of metal cation which may have a value between about 0.01 and about 0.25, suitably between about 0.05 and about 0.15; and Z typically has a value between about 1.8 and about 2.2, suitably between about 1.9 and about 2.0. For example, a manganese oxide contained in an octahedral molecular sieve structure may be synthesized having no metal ions residing in the tunnel. By exposing this manganese oxide to a nickel ion containing solution, an octahedral molecular sieve structure is formed which has an empirical formula of:

$$Ni_R MnO_Z$$

wherein R reflects the proportion of nickel cation in the structure, and the value of R typically is between about 0.01 and about 0.20, suitably between about 0.05 and about 0.15. Z typically has a value between about 1.8 and about 2.2, suitably between about 1.9 and about 2.0.

It is also known that a particular manganese oxide contained in an octahedral molecular sieve structure may be treated to partially exchange metal ions already present in the tunnels with different metal ions. For example, a metal-exchanged cryptomelane may be synthesized by exchanging a portion of the potassium ions resident in the atomic scale tunnels with another metal ion. Generally, the potassium ions residing in the tunnels of cryptomelane can be readily exchanged with any of a variety of metal ions, such as $Cu^{2+}$, $Mg^{2+}$, $Fe^{3+}$, $Co^{2+}$, and $Ni^{2+}$, with nickel being currently preferred. The exchange reaction results in a cryptomelane having an empirical formula:

$$M_Y K_{(X-Y)} MnO_Z$$

wherein M is a metal cation which may be $Cu^{2+}$, $Mg^{2+}$, $Fe^{3+}$, $Co^{2+}$, or $Ni^{2+}$; X is the proportion of potassium present before the exchange reaction which may be between 0 and about 0.25; Y reflects the proportion of metal cation replacing potassium which may be between about 0.01 and about 0.1; v is the oxidation state of the metal cation which replaces potassium ion; and Z typically has a value between about 1.9 and about 2.2, suitably about 1.95. Where the exchanged cation is nickel, for example, the cryptomelane may be referred to as "nickel-exchanged cryptomelane". By controlling the concentration and exposure time, the extent of exchange may be limited to replacing about 10% of the potassium ions in the atomic scale tunnels. Alternatively, conditions can be varied to replace between about 40% and about 50% of the potassium ions with nickel cations.

In a preferred range of embodiments, the manganese oxide contained in an octahedral molecular sieve structure is cryptomelane, i.e., potassium ions reside in the atomic scale tunnel. In such embodiments, the atomic ratio of Mn to K in the cryptomelane is suitably greater than 4:1, typically between about 5:1 and about 15:1. In various preferred embodiments, the cryptomelane may be substantially devoid of metals other than Mn and K. For example, in such embodiments, the atomic ratio of oxygen to the sum of all metals other than Mn, i.e., the ratio of Z/X in the below formula, may be at least about 5, typically between about 7 and about 220. In such preferred embodiments, the cryptomelane has an empirical formula approximating:

$$K_X MnO_Z$$

wherein X may be between 0 and about 0.25, and Z is typically less than about 2.15, more suitably between about 1.8 and about 2.15, and more suitably about 1.9 to about 1.95.

In a manganese oxide contained in an octahedral molecular sieve structure, the oxidation state of the manganese can typically range from about 3.6 to about 4.2. In a preferred range of embodiments, the oxidation state of the manganese can range from about 3.9 to about 4.2. In another preferred range of embodiments, the octahedral molecular sieve structure of the novel cathode is preferably calcined, which can lower the oxidation state of the manganese contained therein. Accordingly, the oxidation state of the Mn contained therein is suitably not greater than about 3.85, more suitably between about 3.60 and about 3.85, and even more suitably between about 3.70 and 3.85.

Preferably, the manganese oxide contained in an octahedral molecular sieve structure has a mean particle size between about 0.01 μm and about 50 μm and a B.E.T. surface area between about 50 m²/g and about 500 m²/g. In a preferred embodiment of the present disclosure, the manganese oxide contained in the mixed catalyst material typically has an average (i.e., mean) particle size between about 0.5 μm and about 2.0 μm, more suitably between about 1.5 μm and about 2.0 μm, more suitably between about 1.7 μm and bout 1.9 μm and even more suitably of about 1.8 μm. In another preferred embodiment, the manganese oxide contained in the mixed catalyst material typically comprises particles having a B.E.T. surface area between about 10 m²/g and about 100 m²/g, more suitably between about 15 m²/g and about 90 m²/g, more suitably between about 16 m²/g and about 45 m²/g and even more suitably of about 28 m²/g.

The octahedral molecular sieve material can be calcined or non-calcined. As generally detailed elsewhere herein, "drying" typically refers to heating a material at a temperature of less than about 300° C. for a given period of time, while "calcining" typically refers to heating a material at a temperature of about 300° C. or higher for a given period of time. As a calcined material, i.e., heat-treated at a temperature of about 300° C. or higher, the octahedral molecular sieve structure of the novel cathode also preferably has low total water content, e.g., suitably less than about 10 wt. %, more suitably less than about 4 wt. %, still more suitably less than about 2 wt. %. The term "heat-treated cryptomelane" can be used to refer to a cryptomelane that has been heat-treated, suitably at a temperature between about 95° C. and about 600° C. (or within another exemplary range as further detailed elsewhere herein), suitably for between about 1 hour and about 5 hours, for example, under static conditions, such as in a muffle furnace, or for a time less than one hour under dynamic conditions, for example, in a rotary kiln or fluid bed. Under reduced pressure conditions, drying can be effected at lower temperatures, for example at 75° C. to 100° C. in a vacuum oven at, for example, about −29 in Hg (about 3.4 kPa) to about −26 in Hg (about 13.6 kPa).

In a preferred embodiment of the present disclosure, the electrochemical cell comprises an anode, an aqueous alkaline electrolytic solution, and an oxygen reduction electrode comprising a mixed manganese oxide catalyst comprising an octahedral molecular sieve structure and $Mn_2O_3$. Specifically, the active catalyst material (of the oxygen reduction electrode) comprises a mixture of manganese oxide having an octahedral molecular sieve structure (such as, for example, cryptomelane) and a manganese oxide having the structure of Bixbyite (i.e., $Mn_2O_3$) for use as a cathode component of an electrochemical cell.

As further detailed elsewhere herein, the cryptomelane material, or other octahedral molecular sieve structure, is preferably heat-treated (for example, calcined) so that a portion of the cryptomelane converts to a Bixbyite ($Mn_2O_3$) phase. The inclusion of the Bixbyite phase with the octahedral molecular sieve structure in the catalyst results in, for example, a higher open circuit voltage, a higher closed circuit voltage, and/or a higher stability of the cathode under storage.

Suitably, in a preferred embodiment, the octahedral molecular sieve structure and the $Mn_2O_3$ are present in the mixed catalyst in a ratio between about 1:9 and about 9:1, more suitably between about 1:4 and about 4:1, more suitably between about 1:3 and about 3:1, and even more suitably between about 1:2 and about 2:1. More suitably, the octahedral molecular sieve structure and the $Mn_2O_3$ are present in the mixed catalyst in a ratio between about 2:1 and 1:1, more suitably between about 1.5:1 and about 1:1 and even more suitably between about 1.27:1 and about 1:1. Even more suitably, the octahedral molecular sieve structure and the $Mn_2O_3$ are present in the mixed catalyst in a ratio of about 1:1.

Another metal cation can be contained in the octahedral molecular sieve structure. That is, a portion of the octahedra which forms the framework of the octahedral molecular sieve may comprise another metal cation in place of a fraction of the manganese. The other metal cation(s), $M^{n+}$, (where n is the oxidation state of the cation) can be, for example, an alkaline earth metal, a p-block metal, a lanthanide, or more preferably, a transition metal. See U.S. Pat. No. 5,702,674 issued to O'Young et al, which is hereby incorporated by reference as if set forth in its entirety. Examples of useful metals for incorporating into the octahedra include Mg, Ti, V, Cr, Fe, Co, Ni, Cu, Zn, Zr, Nb, Ga, In, Ge, Sn, Pb, La, and combinations thereof. Preferred metals include Ti, Zr, Sn, Co, Ni, Cu and Zn. To achieve incorporation of metal cation(s), $M^{n+}$, into the octahedra which form the framework of the octahedral molecular sieve, the cation(s) can be introduced into the reaction mixture during the preparation of the octahedral molecular sieve structure, e.g., in the process of Example 1 of U.S. Pat. No. 4,975,346, and/or in the preparation as described hereinbelow. The metal cation to be contained in the octahedral framework can be introduced in the reaction mixture in a concentration effective to incorporate the metal(s) in a desired proportion of the octahedra which forms the framework of the molecular sieve structure during the synthesis. Any suitable ionic compound (organic or inorganic) of the selected metal(s) can be used which is sufficiently soluble provided that the anion does not interfere with the other reactants or the course of reaction. For example, metal ionic compounds, such as nitrates, sulfates, perchlorates, alkoxides, acetates, oxides, and the like, can be introduced into the reaction mixture, which generally results in the incorporation of a metal cation into a portion of the octahedra which forms the octahedral molecular sieve framework. Manganese oxide contained in an octahedral molecular sieve structure which has a metal other than Mn incorporated into its framework can be referred to as "a manganese oxide octahedral molecular sieve containing a secondary framework metal," e.g., "a manganese oxide octahedral molecular sieve containing framework titanium;" or, more specifically, where the octahedral molecular sieve is cryptomelane, "cryptomelane containing framework titanium."

The air cathode additionally comprises a polymeric binder, which can be a hydrophobic polymer such as polytetrafluoroethylene (PTFE), polyvinylidene fluoride (PVDF), fluorinated ethylene-propylene polymer (FEP), perfluoroalkoxy resin (PFE, a copolymer of tetrafluoroethylene and perfluorovinylethers), ethylene-tetrafluoroethylene copolymer (ETFE), polychlorotrifluoroethylene (PCTFE), ethylenechloro-trifluoroethylene copolymer (ECTFE), and polyvinyl fluoride (PVF), styrene butadiene rubber (SBR), and combinations thereof. The polymeric binder is included to bind the conductive material and active catalyst together and impart hydrophobicity.

The air cathode comprising the components listed above is preferably conductive, porous, gas and liquid permeable, and has both hydrophobic and hydrophilic character. An air cathode for use in a metal-air cell requires both hydrophobic and hydrophilic properties because the cathode must be sufficiently hydrophilic to be wettable to allow hydroxyl ions to diffuse from the cathode active material to the zinc anode surface where they may react with the Zn, but it must also be sufficiently hydrophobic to avoid flooding the cathode material with electrolytic solution, thus causing a reduction in the rate of reaction by creating an excessive barrier to the diffusion of molecular $O_2$ through the liquid phase to the cathode surface for reduction to hydroxyl ions at the active catalyst layer. Without being bound to a particular theory, it is thought that hydrophilic and hydrophobic surfaces and passages are separately distributed throughout the bulk of the cathode material. Advantageously, the cathode may be formed in a relatively thin layer within the cathode can, e.g., in the range between about 5 mils (about 120 μm) and about 20 mils (about 500 μm).

In constructing a cell in which the air cathode comprises the active catalyst material of the present invention, the air cathode is electrically insulated from the anode material by a separator. The separator is a porous, permeable material containing electrolytic solution which allows hydroxyl ions formed by the reduction of oxygen to diffuse to the anode material, but prevents electrical contact between the air cathode and the anode. The separator may be constructed of polypropylene or polyethylene treated to make it wettable with concentrated KOH, PVA film, or ion exchange resin film. Alternatively, the separator may be a fibrous paper having voids into which electrolytic solution may penetrate. The fibers may also absorb the electrolytic solution. In another alternative, the separator may be a fibrous paper in combination with a polymer film. In yet another alternative, the separator may comprise an anion exchange membrane composed of quaternary amine cationic sites. Preferably, the separator is thin, having a thickness less than about 3.0 mils (about 75 μm) so that the cell may comprise predominantly electrode materials, but the separator is suitably at least about 0.5 mils (about 12 μm) so as to prevent electrical contact between the cell electrodes.

The anode may comprise a porous zinc mass, comprising loosely or tightly compacted zinc powder, or an open cell porous zinc monolith, with an ionically conductive electrolytic solution in the pores. Where the anode comprises a zinc powder, individual zinc particles may or may not be porous, but the anode mass has porosity from the interstitial volume defined by a matrix comprising a continuous network of substantially contiguous zinc particles. A complementary matrix comprising a continuous interpenetrating network of preferably gelled electrolytic solution fills the interstitial volume defined by the zinc powder mass. Zinc is a preferred anode material because it is stable in an alkaline electrolyte and achieves a good rate of discharge. Preferably, the total mass of zinc in the zinc-air cell is related to the capacity output of the cell. The mass is limited by the size of the cell, with cells having standard sizes PR44, PR48, PR41, and PR70 being most currently preferred. Preferably, the zinc is a powder, having an average particle size distribution between about 125 μm and about 500 μm. The zinc powder typically has a bulk density between about 2.5 g/cm$^3$ and about 3.5 g/cm$^3$.

The ionically conductive electrolytic solution typically comprises potassium hydroxide, sodium hydroxide, or lithium hydroxide in an aqueous solvent, with potassium hydroxide currently preferred because of its high conductivity and favorable equilibrium vapor pressure. Suitably, the concentration of the electrolyte is between about 20% by weight and about 40% by weight of the electrolytic solution, more suitably from about 30% by weight and about 35% by weight. Preferably, the ionically conductive electrolytic solution is gelled using suspending agents such as, for example, carboxymethylcellulose (CMC), polyacrylic acid, and sodium polyacrylate. The suspending agent is typically present in the electrolytic solution at a concentration between about 0.05% by weight and about 1% by weight, suitably about 0.1% by weight in the electrolytic solution. The ionically conductive electrolyte preferably comprises a surfactant, for example, an oxazoline surfactant. See U.S. Pat. No. 3,389,1454, U.S. Pat. No. 3,336,145, in U.S. Pat. No. 4,536,300, in U.S. Pat. No. 5,758,374, in U.S. Pat. No. 5,407,500, and in U.S. Pat. No. 6,927,000, all of which are hereby incorporated by reference as if set forth in their entirety. Suitably, the surfactant is present at a concentration between about 0.1% by weight and about 1% by weight, more suitably about 0.2% by weight in the electrolytic solution.

At the anode, hydroxyl ions, react with and oxidize the zinc anode material according to the following half-cell reaction:

$$2Zn + 4OH^- \Rightarrow 2ZnO + 2H_2O + 4e^- \quad E°=1.25V \text{ v. S.H.E.} \tag{2}$$

The zinc oxide further reacts with the hydroxyl ions present in the electrolyte to form hydrated zincate ions.

Combining the half cell reactions which occur at the anode and at the cathode yields the overall reaction and the theoretical cell voltage of a zinc-air cell:

$$O_2 + 2Zn \Rightarrow 2ZnO \quad E°=1.65V \text{ v. S.H.E.} \tag{3}$$

In conventional zinc-air cells, the factors affecting polarization cited above, especially peroxide buildup, tend to lower the working cell voltage below the theoretical value.

Catalytic Reduction of Oxygen

The novel active catalyst material and cathode of the present invention are typically capable of operating at a higher voltage for a given current density than a conventional manganese oxide catalyzed cathode. The active catalyst material comprises manganese oxide contained in an octahedral molecular sieve structure. The manganese oxide contained in an octahedral molecular sieve structure advantageously catalyzes reduction of peroxide anions and decomposition of hydrogen peroxide. Peroxide anions are intermediates in the reduction of oxygen to hydroxyl ions, which may be shown according to the following hypothesized mechanism:

$$O_2 + e^- \Rightarrow O_2.^- \tag{1}$$

$$O_2.^- + H_2O + e^- \Rightarrow OOH^- + OH^- \tag{2}$$

$$OOH^- + H_2O + 2e^- \Rightarrow 3OH^- \tag{3}$$

$$O_2 + 2H_2O + 4e^- \Rightarrow 4OH^- \tag{4}$$

Instead of reduction of the peroxide anion in step (3) to the desired hydroxyl ion, the peroxide anion may be protonated to form hydrogen peroxide which may decompose into water and adsorbed oxygen according to the following reaction:

$$OOH^- + H^+ \Rightarrow HOOH \tag{5}$$

$$HOOH \Rightarrow H_2O + \tfrac{1}{2}O_{2(ad)} \tag{6}$$

The adsorbed oxygen may then undergo additional reduction as show in steps (1) and (2) above. Slow reaction kinetics at either step (3) the reduction of peroxide anion or (6) the decomposition of peroxide into water and oxygen may cause peroxides to buildup at the electrode, thus limiting the achievable current density and lowering the working voltage of the cell.

Advantageously, manganese oxide contained in an octahedral molecular sieve structure is believed to exhibit higher catalytic activity for steps (3) and (6) compared to conventional manganese oxide compounds. Preferably, the atomic scale tunnels are formed by a framework comprising a 2×2 arrangement of edge-shared MnO$_6$ octahedra and have approximate dimensions of 4.6 Å×4.6 Å. Without being bound to a particular theory, it is thought that the atomic scale tunnels have dimensions which provide shape selectivity, i.e., geometric or energy state preference for the adsorbed reactant or intermediate, in this instance for peroxide anions, and advantageously catalyzes step (3) the reduction of peroxide anions to hydroxyl ions. Metal exchange of a portion of the potassium ion in the atomic scale tunnels of cryptomelane, such as by Ni$^{2+}$ has been reported to enhance step (6) hydrogen peroxide decomposition. See Zhou et al., *Journal of Catalysis*, 176, 321-328 (1998). Increased catalysis of both steps (3) and (6) enhances the rate of formation of hydroxyl ions, which oxidize zinc metal at the anode, thus allowing the full cell to reflect the full voltage obtainable by the complete redox reaction as shown below.

$$O_2 + 2Zn \Rightarrow 2ZnO \quad E°=1.65V \text{ v. S.H.E.} \tag{7}$$

The air cathode may additionally comprise other oxygen reduction catalysts such as activated carbon and/or catalytically active manganese oxide compounds. For example, the manganese oxide compounds prepared in the method described in U.S. Pat. Nos. 5,308,711 and 5,378,562 to Passaniti et al. exhibit enhanced catalytic activity for oxygen reduction.

Synthesis of Manganese Oxide Contained in an Octahedral Molecular Sieve Structures The synthesis of manganese oxide contained in an octahedral molecular sieve structure has been reported. See DeGuzman, Roberto N. et al., *Chem. Mater.* 1994, 6, 815-821 (the disclosure of which is hereby incorporated in its entirety). See also Giovanili et al., *Chimia*, 35, (1981) 53, U.S. Pat. Nos. 5,597,944 and 5,702,674 to O'Young et al., U.S. Pat. No. 6,486,357 to Suib et al., and U.S. Pat. No. 4,975,346 to Lecerf et al. (the disclosures of which are hereby incorporated in their entirety).

An exemplary preparation of cryptomelane starts with the redox reaction of manganese sulfate ($MnSO_4$) with potassium permanganate ($KMnO_4$) in aqueous acidic solution at a temperature suitably greater than about 50° C., more suitably between about 60° C. and about 70° C. The $Mn^{2+}$ salt can be $MnCl_2$, $MnSO_4$, $Mn(NO_3)_2$, $Mn(CH_3COO)_2$, as well as other known salts. The permanganate can be provided as the sodium salt, potassium salt, magnesium salt, calcium salt, barium salt, ammonium salt, as well as other known salts. The solution can be acidified, preferably to a pH less than about 4.5 using nitric acid, hydrochloric acid, sulfuric acid, and strong organic acids. For the synthesis of cryptomelane, the Mn sources are preferably manganese sulfate ($MnSO_4$) and potassium permanganate ($KMnO_4$). The molar concentration ratio of $[MnO_4^-]/[Mn^{2+}]$ can range from between about 0.2 to about 3.0, suitably between about 0.2 and about 1.4. For example, if the concentration of $Mn^{2+}$ is about 1.0 M, then the concentration of the $MnO_4^-$ is preferably between about 0.2 M and about 1.4 M. The reaction typically proceeds for about 1 hour to about 4 hours, suitably for about 2 hours with stirring. The $MnSO_4$ solution is introduced into a reaction vessel and maintained under agitation at a temperature suitably in the range of about 60° C. to about 70° C. The $KMnO_4$ solution is added slowly to the reactor while the temperature of the resulting mixture is preferably controlled in the aforementioned range. Reaction of $KMnO_4$ and $MnSO_4$ yields cryptomelane, an octahedral molecular sieve in which potassium ions reside in the atomic scale tunnels along with a small amount of water.

To achieve an octahedral molecular sieve structure comprising both manganese and another metal cation incorporated into the octahedra which make up the framework of the octahedral molecular sieve, another metal cation is introduced into the reaction mixture during addition of the oxidizing agent, which in the above preparation, is the permanganate. For example, a suitable ionic compound of a metal such as Mg, Ti, V, Cr, Fe, Co, Ni, Cu, Zn, Zr, Nb, Ga, In, Ge, Sn, Pb, La, and combinations thereof may be added to the solution comprising potassium permanganate. Adding the salt of the metal cation to the permanganate solution, which is then added to the $Mn^{2+}$ solution, is sufficient to incorporate the metal cation into the octahedra which make up the framework of the octahedral molecular sieve. In the preferred synthesis, the added metal cation becomes preferentially incorporated into the framework of the octahedral molecular sieve structure rather than into the atomic scale tunnels. Without being bound to a particular theory, it is thought that the counter cation of the preferred alkali metal permanganate or other oxidizing agent, such as potassium, preferentially resides in the atomic scale tunnels to charge balance the manganese oxide contained in an octahedral molecular sieve. Because the potassium or other counter cation preferentially resides in the atomic scale tunnel, the added metal cation such as one selected from the list above becomes incorporated into the octahedral molecular sieve framework. Suitably, manganese and another metal are charged to the reaction solution in relative proportions approximating their proportions in the octahedral molecular sieve structure. Suitably, the concentration of the metal cation to be incorporated into the octahedra is between about 5% and about 30% of the total concentration of Mn, more suitably about 20% of the total concentration of Mn. Suitably, the concentration of both the $Mn^{2+}$ and the $Mn^{7+}$ sources are present at a ratio of $[MnO_4^-]/[Mn^{2+}]$ in the reaction mixture for preparing an octahedral molecular sieve with an octahedral metal cation can be substantially the same as the ratio of $[MnO_4^-]/[Mn^{2+}]$ in solution for preparing an octahedral molecular sieve without another octahedral metal cation. For example, if the ratio of $[MnO_4^-]/[Mn^{2+}]$ in the preferred synthesis of an octahedral molecular sieve without another octahedral metal cation is about 0.7, the ratio of $[MnO_4^-]/[Mn^{2+}]$ is maintained at about 0.7 when another metal cation is added to the reaction mixture to maintain. In some syntheses, the ratio of $[MnO_4^-]/[Mn^{2+}]$ can be altered if the metal cation added to the reaction mixture for framework incorporation into the octahedral molecular sieve can undergo reduction or oxidation during octahedral molecular sieve synthesis. For example, added $Fe^{2+}$ may be oxidized to $Fe^{3+}$ during the course of the octahedral molecular sieve synthesis. Accordingly, the amount of $MnO_4^-$ oxidizing agent added can be increased relative to the amount of $Mn^{2+}$, which increases the ratio of $[MnO_4^-]/[Mn^{2+}]$. Conversely, another metal cation added for framework incorporation may undergo reduction and thus the amount of $Mn^{2+}$ can be increased relative to $MnO_4^-$, which decreases the ratio of $[MnO_4^-]/[Mn^{2+}]$. The concentration of the other metal cation in the reaction mixture can be sufficient to synthesize an octahedral molecular sieve structure in which between about 5% and about 30% of the octahedra comprise another metal cation in place of manganese, more suitably between about 5% and about 20% of the octahedra comprise another metal cation in place of manganese, even more suitably about 20% of the octahedra comprise another metal cation in place of manganese.

Typically, while the reaction progresses, cryptomelane precipitates out of the aqueous solution, and the precipitate is characterized by a brownish-black color. Cryptomelane is sparingly soluble. Upon completion of the reaction, the brownish-black precipitate is filtered under vacuum and washed with distilled water. The cryptomelane material typically has an average particle size between about 0.01 μm and about 10 μm, a B.E.T. surface area between about 50 $m^2$/g and about 500 $m^2$/g. The material has a density between about 3 g/$cm^3$ and about 4.5 g/$cm^3$.

Alternatively, the manganese oxide contained in an octahedral molecular sieve structure may be synthesized without metal ions residing in the tunnels. See Example 1 of Lecerf et al. in which the starting material is $MnSO_4$ oxidized with ammonium persulfate.

The cryptomelane material or other octahedral molecular sieve structure is preferably heat-treated, for example, calcined, to evaporate surface and lattice water and to attain a reduced manganese oxidation state. Calcination and/or drying may occur in an oven, for example, at a temperature suitably between about 95° C. and about 650° C., more suitably between about 100° C. and about 500° C., even more suitably between about 150° C. and about 400° C. In a preferred embodiment of the present disclosure, however, calcination may occur at a temperature suitably between about 450° C. and about 650° C., more suitably between about 500° C. and about 600° C., more suitably between about 525° C. and about 575° C., and even more suitably at about 550° C. The material may be calcined and/or dried typically between about 1 and about 5 hours, more suitably between about 2 hours and about 4 hours, even more suitably between about 3 hours and about 4 hours. Calcination may occur in air, in an oxygen atmosphere, or in a nitrogen atmosphere, but in the interest of costs, air is preferred. Calcination may occur under a vacuum, but in the interest of costs, ambient pressure is preferred.

Typically, the average oxidation state of the manganese in heat-treated cryptomelane is no greater than about 4.2, suitably no greater than about 3.85, more suitably between about 3.6 and about 3.85, and still more suitably between about 3.7 and about 3.85. In a preferred embodiment of the present disclosure, however, the average oxidation state of the manganese in the heat-treated mixed catalyst is less than about 3.7, less than about 3.6, less than about 3.5 or even less than about 3.4, suitably between about 3.1 and 3.7, more suitably between about 3.2 and 3.6, more suitably between about 3.25 and 3.5, and even more suitably about 3.3.

The average oxidation state represents a mixed valence of Mn ions between Mn(IV), Mn(III), and Mn (II) with higher valences included in small amounts. The calcined cryptomelane typically has a total water content less than about 10 wt. %, suitably less than about 4 wt. %, more suitably less than about 2 wt. %.

The Mn oxidation state can be controlled at least in part by the ratio of Mn(VII) and Mn(II), e.g., $KMnO_4$ and $MnSO_4$ used in the redox reaction by which the manganese oxide contained in an octahedral molecular sieve structure is formed. The oxidation state of Mn as contained in the precipitate can be reduced by high temperature calcination. Lower oxidation states are preferred because the higher $Mn^{3+}$ content not only creates a mixed valence oxide with higher electronic conductivity, but also increases the efficacy of the oxide for catalysis of oxygen reduction. Advantageously, high temperature calcination also lowers the material's water content, improves its crystallinity, generally increases particle size, decreases surface area, and removes other impurities such as mixed sulfur containing oxides.

After synthesis of the manganese oxide contained in an octahedral molecular sieve structure, the cations in the atomic scale tunnels can be exchanged for another metal cation. If the synthesis placed no cations in the tunnels, metal cations can be placed in the atomic scale tunnels. After the preferred synthesis, the octahedral molecular sieve atomic scale tunnels contain potassium ions. The potassium ions can be replaced by exposing the octahedral molecular sieve to a solution comprising a metal cation, preferably as its nitrate salt. Accordingly, the preparation of a cryptomelane catalyst of the present invention can additionally comprise the step of exchanging a portion of the potassium ions with other metal ions. Nickel-exchanged cryptomelane has high catalytic activity for peroxide decomposition. Preferably, the exchange can be carried out by percolating over the dried cryptomelane an aqueous solution comprising nickel ions in a concentration between about 10% and about 50% with a volume of solution such that the ratio of nickel cation in aqueous solution to potassium cation in the cryptomelane is between about 2:1 and about 10:1. The extent of exchange may be controlled by adjusting the concentration of the nickel ion solution, by the exposure time, and the temperature. The exchange can be carried out from room temperature, i.e., about 25° C., up to about 100° C., preferably at room temperature. By controlling the concentration and exposure time, the extent of exchange may be limited to replacing about 10% of the potassium ions in the atomic scale tunnels. Alternatively, conditions can be varied to exchange between about 40% and about 50% of the potassium ions with nickel cations.

The additional treatments, such as calcinations, nickel or other metal exchange, and metal-framework incorporation, may advantageously improve the voltage of the cathode using the manganese oxide contained in an octahedral molecular sieve structure of the present invention.

Figure 3:
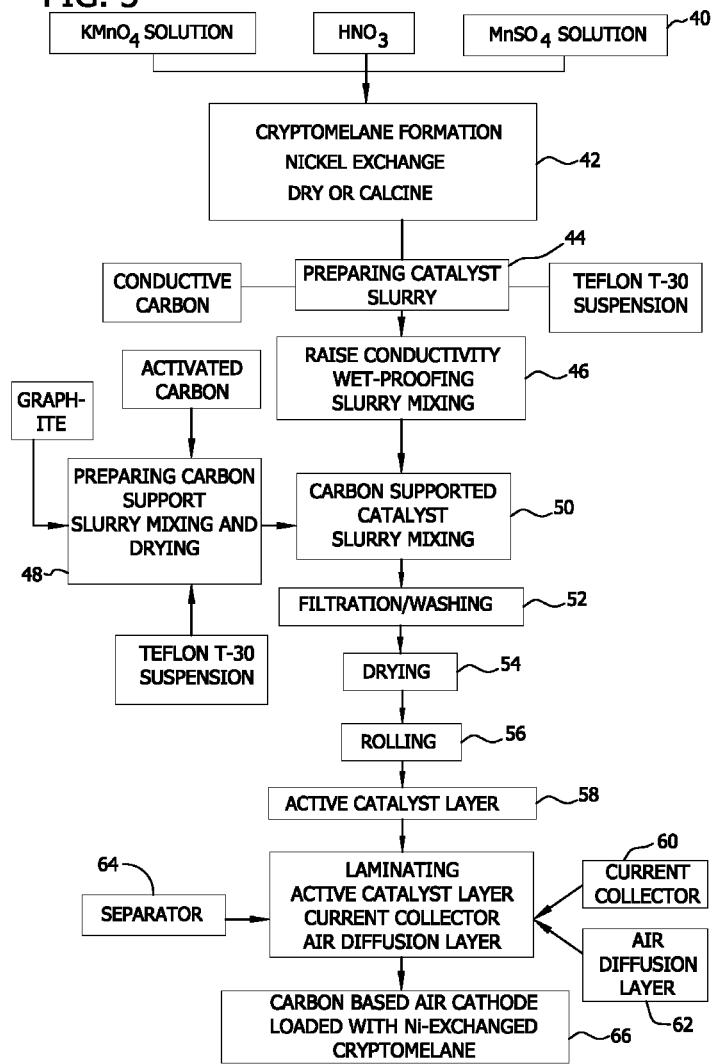
FIG. 3 is a flow chart showing the entire preparation of a cathode according to the present invention.

Preparation of Air Cathode Comprising Manganese Oxide Contained in an Octahedral Molecular Sieve Manganese oxide contained in an octahedral molecular sieve, such as, for example, heat-treated (optionally nickel-exchanged and/or optionally containing framework titanium) cryptomelane, whose preparation is described generally above and more specifically in the examples below, can be used as the active catalyst material of an air cathode for use in a zinc-air cell. Referring to FIG. 3, a flow chart is presented showing, generally, the steps in fabricating an air cathode according to the present invention. Starting from the top of the flow chart, $Mn^{2+}$ and $Mn^{7+}$ salts are reacted in the presence of acid, such as nitric acid, to yield cryptomelane 40. Potassium ions resident in the atomic scale tunnels of the cryptomelane active catalyst material are optionally exchanged 42 for another metal cation, preferably nickel. Thereafter, the active catalyst material is calcined in the manner described above. Optionally, an additional metal cation can be added to the reaction mixture. The addition of the metal cation can result in the incorporation of the metal cation into a portion of the octahedra which forms the framework of the octahedral molecular sieve structure. Preferably, the metal cation is $Ti^{4+}$.

Heat-treated (optionally nickel-exchanged and/or optionally containing framework titanium) cryptomelane, carbon black, and hydrophobic polymeric binder (PTFE suspension) are then combined 44 into a catalyst slurry in preferably aqueous medium. The added carbon and hydrophobic polymer serve to wet proof 46 the mix to prevent flooding in the finished cathode. The carbon black additionally imparts electrical conductivity to the finished cathode. In preparing the catalyst slurry, heat-treated (optionally nickel-exchanged and/or optionally containing framework titanium) cryptomelane can be mixed with carbon black in water for between about 15 min and about 120 min, with agitation, at room temperature. Next, dry PTFE powder or a suspension of PTFE or other binder may be added to the combined cryptomelane/carbon black slurry to yield a mixture typically comprising between about 60% and about 90% by weight cryptomelane, between about 1% and about 10% by weight carbon, and between about 1% and about 40% by weight binder, the balance water. As alternatives to polytetrafluoroethylene (PTFE), the binder may be selected from among other polymeric materials such as polyvinylidene fluoride (PVDF), fluorinated ethylene polymer (FEP), perfluoroalkoxy resin (PFE, a copolymer of tetrafluoroethylene and perfluorovinylethers), ethylene-tetrafluoroethylene copolymer (ETFE), polychlorotrifluoroethylene (PCTFE), ethylene-chloro-trifluoroethylene copolymer (ECTFE), polyvinyl fluoride (PVF) styrene butadiene rubber (SBR), and combinations thereof. The catalyst slurry is agitated for about 30 min to about 120 min.

A second mix, the carbon support mix, is prepared by combining 48 activated carbon, graphite, and polymeric binder (PTFE suspension) into an aqueous slurry. The activated carbon is an oxygen reduction catalyst, and the graphite is added to impart electrical conductivity to the finished cathode. The carbon support slurry typically comprises between about 50% and about 90% by weight carbon and between about 5% and about 50% by weight binder, in aqueous medium. This slurry may be blended about 30 min, filtered under vacuum, washed with distilled water, and dried at a temperature between about 90° C. and about 120° C. for about 2 hours to about 12 hours in an oven under an atmosphere of air.

Alternatively, the carbon support mix can be prepared to comprise another manganese oxide compound. Accordingly, the final active cathode material can comprise manganese oxide contained in an octahedral molecular sieve structure and another manganese oxide compound. Optionally, the manganese oxide compound can be prepared according to the methods disclosed by Passaniti et al. (U.S. Pat. Nos. 5,308,711 and 5,378,562.) Briefly, those patents disclose preparing a manganese oxide compound by adding activated carbon to a solution comprising alkali metal permanganate to produce an aqueous permanganate solution having activated carbon slurried therein. The activated carbon reduces the permanganate to a manganese oxide compound having catalytic activity for the reduction of oxygen. The preparation of the catalytically active manganese oxide compound can occur by contacting alkali metal permanganate with activated carbon in a weight ratio of alkali metal permanganate to carbon between about 0.01:1 and about 0.2:1, more suitably between about 0.02:1 and about 0.1:1, and even more suitably between about 0.04:1 and about 0.08:1 to prepare an aqueous solution having a volume of about 5 mL of water per 1 g of total solids. The reaction occurs over about 10 minutes with mixing. The other ingredients of the carbon support mix may be added directly into the aqueous solution comprising the manganese oxide compound upon completion of the redox reaction between the potassium permanganate and activated carbon. In a finished cathode comprising a manganese oxide contained in an octahedral molecular sieve structure and another manganese oxide compound, such as, for example, the manganese oxide compound of Passaniti et al., between about 5% and about 40% of the manganese oxide can be contained in the octahedral molecular sieve structure, more preferably between about 15% and about 35%, and the remainder as another manganese oxide compound. The manganese in the manganese oxide compound other than the octahedral molecular sieve can have an oxidation state ranging anywhere from about 2 to about 4. Accordingly, the total manganese, i.e., the manganese both contained in the octahedral molecular sieve and the manganese in the other manganese oxide compound, in the cathode suitably has an average oxidation state between about 2.1 and about 4.0.

In yet another alternative, both the catalyst mix and the carbon support mix can be prepared by a dry mixing process. The catalyst mix can be prepared by mixing cryptomelane, carbon black, and hydrophobic polymeric binder (PTFE) with a mechanical mixer, such as a food processor. The carbon support mix can be separately prepared by combining activated carbon, graphite, and polymeric binder (PTFE) with a mechanical mixer.

In the preferred wet process, the catalyst slurry and carbon support mix are combined 50 to make a cathode mix, which is mixed and then preferably filtered, washed 52 with distilled water, and dried 54 at a temperature suitably between about 75° C. and about 120° C. between about 2 hours and about 12 hours in an oven under an atmosphere of air. The dried carbon support slurry has an approximate bulk density between about 0.20 g/cm$^3$ and about 0.50 g/cm$^3$. In the alternative where both catalyst mix and carbon support mix are prepared by dry mixing, combining the two mixes yields a dry cathode mix which does not require further drying.

Preferably, the cathode mix is a combination of two mixtures, prepared separately, as described above. In an alternative method of preparation, all ingredients of the cathode mix may be combined directly into a single mixture, which can be a slurry or dry mix. The two mixture preparation method advantageously improves the balance of hydrophobicity and hydrophilicity in the air cathode. Further, the two-mixture preparation maintains a separation of the manganese oxides having octahedral molecular sieve structure separate and the activated carbon, thus inhibiting a redox reaction between the activated carbon and the manganese oxides having octahedral molecular sieve structures from occurring before the catalyst slurry and carbon support mixture are combined.

The dry cathode mix is preferably further mixed and kneaded to ensure intimate mixing of the constituents to attain consistency and uniformity of hydrophobic and hydrophilic regions within the mix. The dried cathode mix is then coarsely milled to break up large clumps. The isolated particles are of sufficient size to press together into a sheet, which is difficult to achieve for large clumps and dust particles. The sieved particles are fed to rollers and rolled 56 into a cathode sheet, which is referred to as an active catalyst layer 58. The rolled material typically has a density between about 0.8 g/cm$^3$ and about 1.4 g/cm$^3$. Suitably, the cathode sheets are very thin, e.g., between about 2 mils (about 50 μm) and about 20 mils (about 500 μm) in thickness, to allow the cell to contain as much Zn anode material as possible, given the dimensional constraints of the particular cell.

These cathode sheets are pressed 60 into a current collector substrate, which is a cross bonded screen having Ni strands woven therein, the Ni screen conveniently having a 40 mesh size. The current collector substrate transmits current to the cathode can and minimizes the voltage drop between the cathode/electrolytic solution interface and the positive terminal of the cell. The cathode sheet rolling pressure and pressure to press the cathode sheet into the current collector substrate are relatively low such that the pressed cathode material maintains high porosity.

The resulting cathode sheet is laminated 62 with an air diffusion layer. An air diffusion layer of hydrophobic material such as, e.g., a pure PTFE membrane, is laminated on the side of the cathode sheet opposite to the side of the cathode sheet which was pressed into the current collector.

Finally, a thin polypropylene or other dielectric separator sheet is glued 64 onto the side of the cathode sheet which was pressed into the conductive current collector. This cathode sheet is now ready to be punched to yield individual cathodes for use in air-metal cells. The cathode sheet is simultaneously punched with an additional PTFE membrane sheet adjacent to the air diffusion layer along with a non-woven paper layer adjacent to the dielectric separator sheet. The sheet may be punched 66 to yield disc-shaped carbon-based air cathodes loaded with heat-treated (and optionally nickel-exchanged) cryptomelane. Depending upon the size of the cell, the cathode sheet may typically be punched to yield air cathodes having a diameter between about 5 mm and about 13 mm.

EXAMPLES

The following examples further illustrate the invention.

Example 1

Synthesis of Cryptomelane

To prepare cryptomelane, manganese sulfate monohydrate ($MnSO_4 \cdot H_2O$; 88 g; available from Alfa/Aesar, Ward Hill, Mass.) was stirred into a nitric acid solution that had been prepared by mixing concentrated nitric acid (30 mL) with deionized water (300 mL). The resulting acidic Mn salt solution was constantly stirred with a magnetic stir bar.

The temperature of the solution was raised to 60 C, and an aqueous solution containing 5.89% by weight potassium permanganate (1000 g) was slowly added with constant stirring (KMnO₄ from Alfa/Aesar, Ward Hill, Mass.). The redox reaction between $Mn^{2+}$ from $MnSO_4$ and $Mn^{7+}$ from $KMnO_4$ resulted in the formation of a brownish-black precipitate. The slurry was stirred at 60° C. for four hours. Finally, the cryptomelane product was isolated by filtration under vacuum and washing with distilled water (500 mL).

Example 2

X-Ray Diffraction Characterization of Cryptomelane

Figure 4:
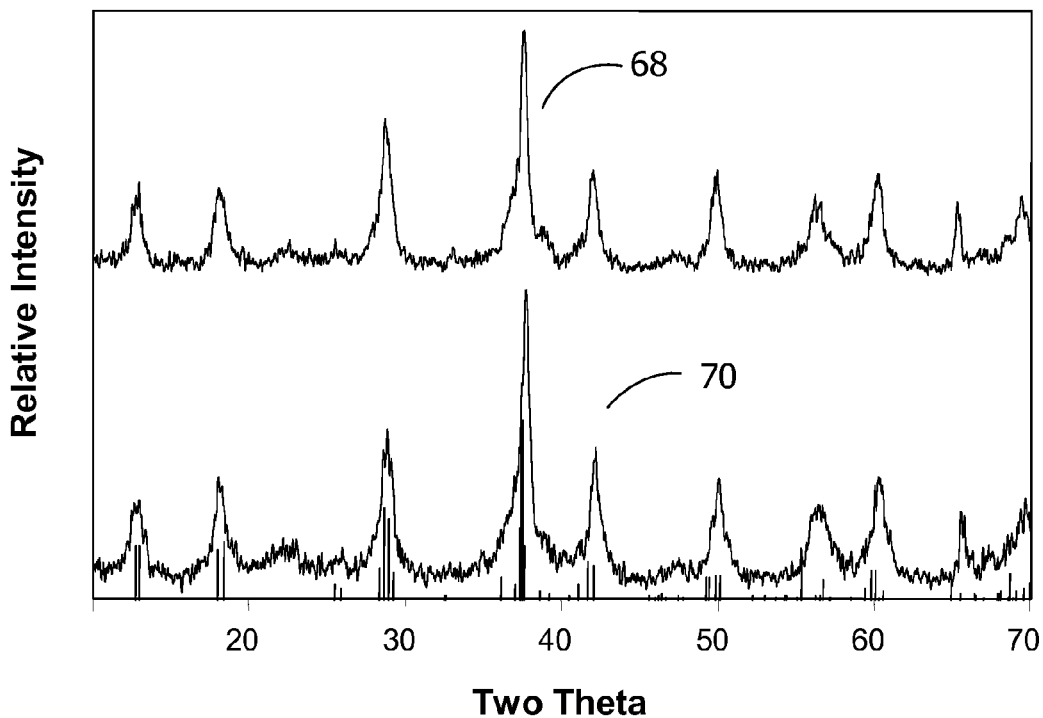
FIG. 4 shows X-ray powder diffraction (XRD) patterns of cryptomelanes. The bottom pattern 70 shows empirically determined X-ray diffraction peaks corresponding to cryptomelane, which had been dried at 95° C. This bottom pattern is overlaid with the standard PDF pattern for cryptomelane, M-$K_{2-x}Mn_8O_{16}$ (44-1386), which is indicated by the narrow lines. The PDF patterns (powder diffraction files) are available as a database. The top pattern 68 shows empirically determined X-ray diffraction peaks corresponding to cryptomelane, which had been calcined at 300° C. The XRD pattern of the material of the present invention matched closely to that of PDF (44-1386) corresponding to M-$K_{2-x}Mn_8O_{16}$.

To determine whether the synthesis successfully yielded cryptomelane, samples of the material prepared according to the method of Example 1 were heat treated and prepared for X-ray diffraction analysis. A first sample was heat-treated at 300° C. and loaded onto a powder sample holder for an X-ray diffractometer and subjected to X-ray diffraction analysis. A second sample was heat-treated at 95° C. and loaded onto a powder sample holder for an X-ray diffractometer and subjected to X-ray diffraction analysis. X-ray diffraction confirmed that the resultant material had cryptomelane structure. See FIG. 4 for X-ray diffraction patterns of cryptomelanes heat treated at 300° C. 68 and heat treated at 95° C. 70 compared against standard cryptomelane-M-$K_2Mn_8O_{16}$ (44-1386). Approximate values for the major peak positions for the sample heat treated at 300° C. are presented in Table 1 below. The exact numerical values obtained by X-ray diffraction analysis of a crystal structure can vary depending upon the X-ray diffractometer and analytical conditions. Therefore, values may vary somewhat from the values presented in Table 1.

TABLE 1

Major Peak Positions from the X-Ray Diffraction of Cryptomelane Heat Treated at 300° C.

| Angle, 2-Theta ° | d value, Angstrom | Intensity, count | Intensity, % |
|---|---|---|---|
| 12.7 | 7.0 | 41.9 | 43 |
| 18.1 | 4.9 | 39.1 | 40 |
| 25.6 | 3.5 | 8.2 | 8 |
| 28.7 | 3.1 | 59.3 | 61 |
| 37.8 | 2.4 | 96.8 | 100 |
| 39.1 | 2.3 | 8.13 | 8 |
| 42.0 | 2.2 | 36 | 37 |
| 49.9 | 1.8 | 38.1 | 39 |
| 56.1 | 1.6 | 16.8 | 17 |
| 56.4 | 1.6 | 21.7 | 22 |
| 56.7 | 1.6 | 16.4 | 17 |
| 60.2 | 1.5 | 39.4 | 41 |
| 65.4 | 1.4 | 36.6 | 38 |
| 69.5 | 1.4 | 16.9 | 17 |

From these XRD data, it was determined that cryptomelane has unit cell parameters: a=9.848 Å±0.02 Å, b=2.862 Å±0.02 Å, c=9.843 Å±0.06 Å, and β=90.08°±0.4°, when calculated as a monoclinic unit cell.

Example 3

Nickel-Exchanged Cryptomelane

Exchange of potassium ions residing within the cryptomelane tunnels with nickel ions was performed by suspending a sample of the solid material prepared according to the method of Example 1 in 0.1M $NiNO_3$ solution (1 Liter) available from Alfa/Aesar, Ward Hill, Mass. The resultant nickel-exchanged cryptomelane was filtered under vacuum and washed with distilled water (1000 mL).

Figure 5:
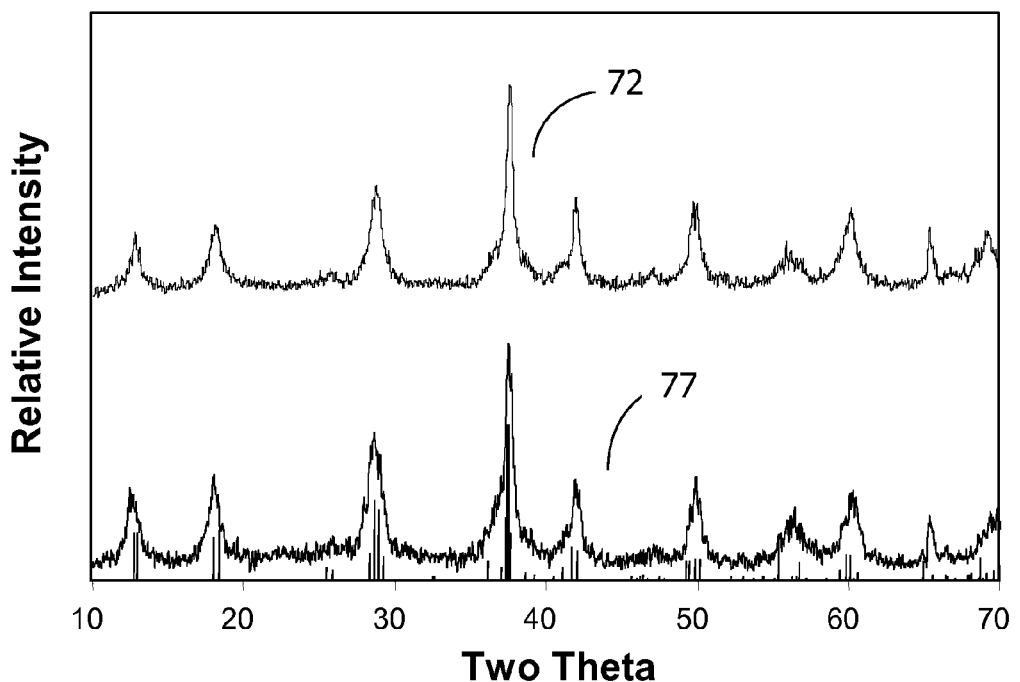
FIG. 5 shows X-ray powder diffraction (XRD) patterns of cryptomelanes. The bottom pattern 77 shows empirically determined X-ray diffraction peaks corresponding to cryptomelane, which had been calcined at 300° C. This bottom pattern is overlaid with the standard PDF pattern for cryptomelane, M-$K_{2-x}Mn_8O_{16}$ (44-1386), which is indicated by the narrow lines. The top pattern 72 shows empirically determined X-ray diffraction peaks corresponding to Ni-exchanged cryptomelane, which had been calcined at 300° C.

Alternatively, the exchange of potassium ions with nickel ions was carried out by passing 0.1M $NiNO_3$ solution through a fixed bed comprising particulate cryptomelane prepared according to the method of Example 1. For example, a sample of the precipitate prepared according to the method of Example 1 was recovered by filtration and the $NiNO_3$ solution passed through the solid filter cake under vacuum filtration. The sample was heat treated at 300° C. and prepared for X-ray diffraction analysis. Referring now to FIG. 5, an X-ray diffraction pattern of nickel-exchanged cryptomelane heat treated at 300° C. 72 may be compared against the PDF of cryptomelane-M-$K_{2-x}Mn_8O_{16}$ (44-1386) and against an empirically determined X-ray diffraction pattern of unexchanged cryptomelane heat treated at 300° C. 77.

Example 4

Cryptomelane Calcination

Samples (50 grams each) were taken from the solid filtered cake of nickel-exchanged cryptomelane prepared according to the method of Example 3 and subjected to heat treatment at temperatures of 95° C., 120° C., and 400° C. for four hours. Additionally, samples of unexchanged cryptomelanes prepared according to the method of Example 1 were subjected to high temperature drying and/or calcination at temperatures of about 120° C., 300° C., 500° C., 600° C., and 700° C.

Figure 6:
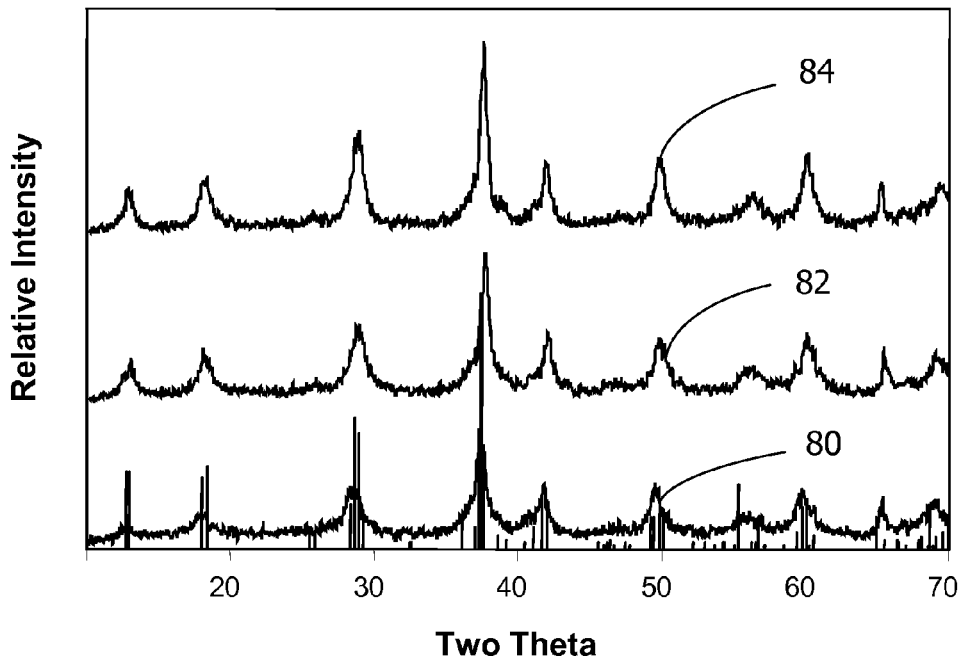
FIG. 6 shows X-ray powder diffraction (XRD) patterns of cryptomelanes. The bottom pattern 80 shows empirically determined X-ray diffraction peaks corresponding to Ni-exchanged cryptomelane dried at 95° C. This bottom pattern is overlaid with the standard pattern for cryptomelane, M-$K_{2-x}Mn_8O_{16}$ (44-1386), which is indicated by the narrow lines. The middle pattern 82 shows empirically determined X-ray diffraction peaks corresponding to Ni-exchanged cryptomelane dried at 120° C. The top pattern 84 shows empirically determined X-ray diffraction peaks corresponding to Ni-exchanged cryptomelane calcined at 400° C.

Referring to FIG. 6, the calcined nickel-exchanged cryptomelane samples were prepared for X-ray diffraction, and X-ray diffraction patterns of each sample dried at 95° C. (80 in FIG. 6), 120° C. (82 in FIG. 6), and calcined at 400° C. (84 in FIG. 6) were obtained. As can be seen from the XRD patterns, the structure remains intact during the calcination process, even at calcination carried out at temperatures as high as 400° C. In fact, the crystallinity of the structure improves with increasing calcination temperature, as can be seen by the narrower peaks in the X-ray diffraction patterns.

The change in chemical and physical properties with calcination temperature for unexchanged cryptomelane is shown in Table 2. The change in chemical and physical properties with calcination temperature for non-exchanged cryptomelane is shown in Table 3. The data indicate a trend toward lower manganese oxidation state with increasing calcination temperature. Without being bound by a particular theory, it is thought that high temperature calcination causes the thermal decomposition of the cryptomelane and release of oxygen. It is apparent that the surface area of the samples tends to decrease and the particle size of the samples tends to increase with increasing calcination temperature. However, at very high temperature calcination, such as above about 600° C., the oxidation state decreases even further and there is a reversal in the trend toward smaller surface area and larger particle size. Without being bound by a particular theory, it is thought that high temperature calcination results in a phase transition from cryptomelane to $Mn_2O_3$.

TABLE 2

Chemical and Physical Properties of Unexchanged Cryptomelane Catalyst at Different Calcination Temperatures

| Calcination and/or Drying Temperature (° C.) | Manganese Oxidation State | Surface Area (m²/mg) | Mean Particle size (μm) |
|---|---|---|---|
| 95 | 3.95 | 89.22 | 1.941 |
| 300 | 3.82 | 63.86 | 2.077 |
| 500 | 3.59 | 17.08 | 2.513 |
| 600 | 3.19 | 42.28 | 1.963 |
| 700 | 3.14 | 8.49 | 1.376 |

TABLE 3

Chemical and Physical Properties of Ni-exchanged Cryptomelane Catalyst at Different Calcination Temperatures

| Calcination and/or Drying Temperature (° C.) | Manganese Oxidation State | Surface Area (m²/mg) | Mean Particle size (μm) |
|---|---|---|---|
| 95 | 4.07 | 113.63 | 3.096 |
| 120 | 3.93 | 114.42 | 2.467 |
| 400 | 3.82 | 89.06 | 3.534 |

Example 5

Stability Testing of Ni-Exchanged Cryptomelane

Figure 7:
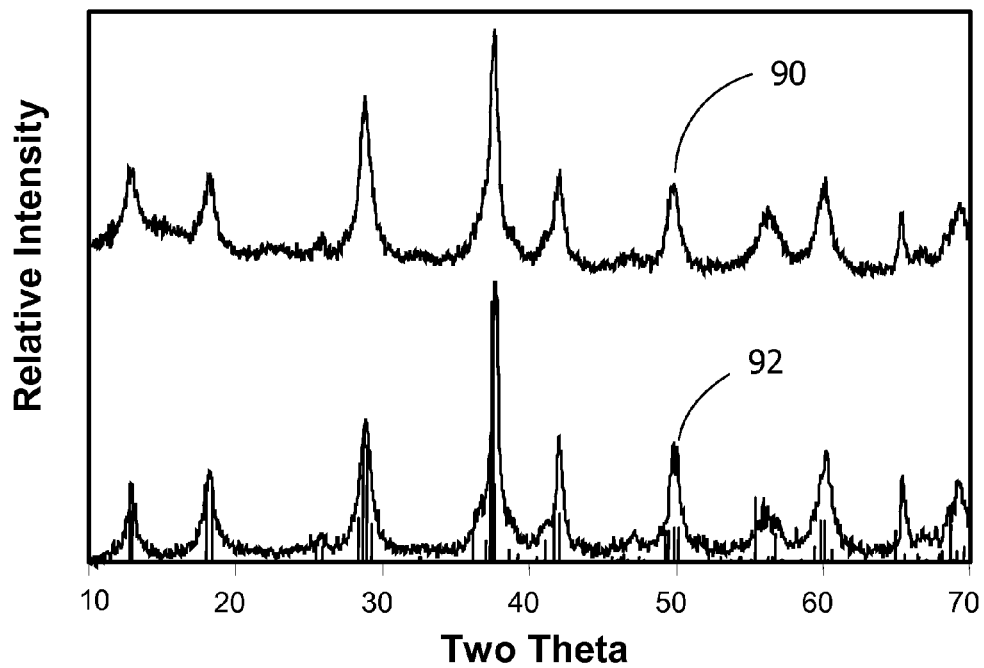
FIG. 7 shows X-ray powder diffraction (XRD) patterns of cryptomelanes. The bottom pattern 92 shows empirically determined X-ray diffraction peaks corresponding to Ni-exchanged cryptomelane calcined at 300° C. This bottom pattern is overlaid with the standard pattern for cryptomelane, M-$K_{2-x}Mn_8O_{16}$ (44-1386), which is indicated by the narrow lines. The top pattern 90 shows empirically determined X-ray diffraction peaks corresponding to Ni-exchanged cryptomelane calcined at 300° C., which has been additionally subjected to 16 hours of stirring in KOH electrolyte.

The stability of Ni-exchanged cryptomelane in basic solution was tested. A sample of Ni-exchanged cryptomelane prepared according to the method of Example 4 but heat treated 300° C. (1 g) was added to KOH electrolytic solution (100 mL). The solution was stirred for 16 hours. After stirring, the solution was filtered under vacuum, washed with deionized water (100 mL), and dried at a temperature between about 65° C. and about 100° C. for about 60 min in an oven under an atmosphere of air. The sample of Ni-exchanged cryptomelane heat treated at 300° C. and further subjected to the treatment described above was prepared for X-ray diffraction. Another sample of Ni-exchanged cryptomelane heat treated at 300° C. but not exposed to the KOH electrolytic solution was also prepared for X-ray diffraction. The X-ray diffraction patterns of both KOH-exposed 90 and unexposed 92 Ni-exchanged cryptomelanes heat treated at 300° C. are shown in FIG. 7. As can be seen from the patterns, Ni-exchanged cryptomelane is stable to this treatment against visible decomposition, crystal structure loss, and performance.

Example 6

Preparation of Cryptomelane Containing Framework Titanium

Manganese sulfate monohydrate ($MnSO_4.H_2O$; 77 g; available from Alfa/Aesar, Ward Hill, Mass.) was stirred into a nitric acid solution that had been prepared by mixing concentrated nitric acid (30 mL) with deionized water (300 mL). The resulting acidic Mn salt solution was constantly stirred with a magnetic stir bar.

The temperature of the solution was raised to 60° C. An aqueous solution containing potassium permanganate and titanium oxide sulfate (prepared by dissolving 51.5 g $KMnO_4$ and 26.95 g $TiOSO_4.H_2O$ in concentrated $H_2SO_4$ and diluting to 1000 g with water, both reactants from Alfa/Aesar, Ward Hill, Mass.) was slowly added with constant stirring. The redox reaction between $Mn^{2+}$ from $MnSO_4$ and $Mn^{7+}$ from $KMnO_4$ resulted in the formation of a brownish-black precipitate with $Ti^{4+}$ ions in the framework. The slurry was stirred at 60° C. for two hours. Finally, the cryptomelane containing framework titanium was isolated by filtration under vacuum and washing with distilled water (500 mL). X-ray diffraction and chemical analysis were used to identify the structure and chemical formula of the structure.

Alternatively, the cryptomelane containing framework titanium is also prepared by adding predetermined quantity of soluble titanium oxide sulfate in the manganese sulfate solution to which potassium permanganate solution is added.

Example 7

Preparation of Dried Cathode Mix with Nickel-Exchanged Cryptomelane

A catalyst slurry was prepared by adding nickel-exchanged cryptomelane (30 g, calcined at 400° C.) prepared according to the method of Example 4 and carbon black (7 g; available from Cabot Corp., Billerica, Mass.) to DI water (100 mL). The slurry was mixed with a magnetic stir bar for 10 minutes. T-30 Teflon® suspension (3.3 g; from DuPont) was added to the slurry. The resulting catalyst slurry was mixed for an additional 30 minutes.

A carbon support mix was prepared by mixing PW activated carbon (45 g; from Calgon, Corp., Pittsburgh, Pa.), SF6 graphite (3 g; from Timcal, Westlake, Ohio), and T-30 Teflon® suspension (21.4 g) in DI water (200 mL). This carbon support slurry was thoroughly blended, filtered, washed, and dried in an oven at 95° C. The resulting cake was blended in a dry mixture, sieved, and stored.

To prepare the cathode mix, the dried and granulated carbon support mix was added to the catalyst slurry and mixed together for 10 minutes. The combined mixture was filtered, washed, and dried in an oven at 95° C. overnight to yield the cathode mix.

Example 8

Preparation of Dried Cathode Mix with Heat-Treated Cryptomelane

Alternatively, the dried cathode mix was prepared using heat-treated cryptomelane prepared according to the method of Example 4. The preparation of the dried cathode mix is substantially the same as shown in Example 7, provided that unexchanged, heat-treated cryptomelane is added to make the catalyst slurry instead of nickel-exchanged cryptomelane. In this example, the cathode was also prepared with a catalyzed carbon support comprising catalytically active manganese oxide compounds prepared according to the method described by Passaniti et al. (U.S. Pat. Nos. 5,308,711 and 5,378,562.)

Example 9

Cathode Fabrication

Two dry cathode mixes prepared according to the methods described in Examples 7 and 8 were separately dry mixed and kneaded in a blender to ensure intimate mixing of the constituents. The cathode mixes were then milled and fed to rollers to roll into two cathode sheets having a density between about 0.8 g/cm³ and about 1.4 g/cm³.

These cathode sheets were pressed into a current collector substrate, which was a cross bonded screen having Ni strands woven therein (from GDC, Hanover, Pa.) having a 40 mesh size and 5 mil (about 120 μm) wires. A strip of each of these cathode sheets were used for half-cell testing as described in Example 10.

An air diffusion layer of pure PTFE membrane was laminated on the side of the cathode sheet opposite to the side of the cathode sheet which was pressed into the current collector. Finally, a thin polypropylene separator sheet (from Hoechst Celanese, Charlotte, N.C.) was glued onto the current collector. According to this method, two cathode sheets were prepared: (a) a first cathode sheet comprising heat-treated cryptomelane in combination with catalytically active manganese oxide compounds, and (b) a second cathode sheet comprising nickel-exchanged cryptomelane catalyst. The cathode sheet is simultaneously punched with an additional PTFE membrane sheet adjacent to the air diffusion layer along with a non-woven paper (from Mitsubishi Corp., New York, N.Y.) adjacent to the dielectric separator sheet. These punched sheets are then used in the construction of the full cell.

Example 10

Half Cell Testing of Heat-Treated and Nickel-Exchanged Cryptomelane Air Cathodes The fabricated cathode strips of Example 9 were tested in half cells to obtain information about the cathode without interference from the anode reaction or the air diffusion layer. A first cathode strip contained heat-treated cryptomelane in combination with catalytically active manganese oxide compounds. A second cathode strip contained nickel-exchanged cryptomelane catalyst. The cathode strips served as the working electrodes. A piece of zinc wire and nickel mesh served as the reference and counter electrodes, respectively. A solution of potassium hydroxide and zinc oxide (31% KOH and 2% ZnO) in DI water was used as the electrolytic solution. The current collector side of the cathode strips was exposed to the electrolytic solution, while the catalyst mix layer was exposed to the air.

Figure 8:
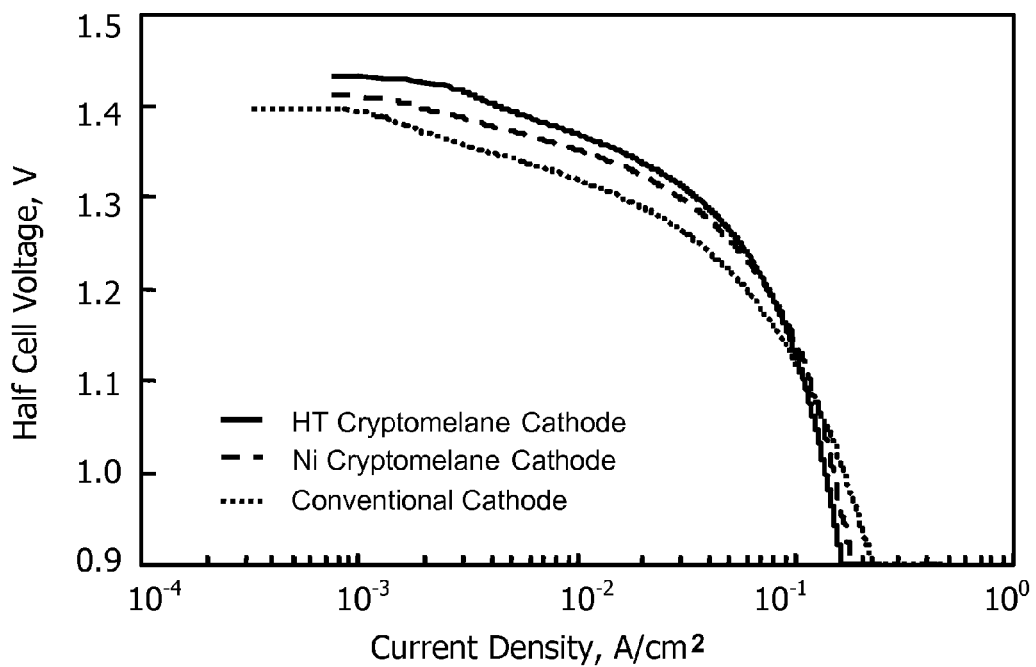
FIG. 8 shows polarization curves for: ( ) a cathode loaded with Ni-exchanged cryptomelane, ( ) a cathode loaded with heat-treated cryptomelane in combination with catalytically active manganese oxide compounds, and ( ) a conventional cathode.

The electrochemical measurements were performed using a Solartron (SI 1287) Instrument. Current v. Voltage (polarization) behavior of the heat-treated cryptomelane cathode and the nickel-exchanged cryptomelane cathode was obtained by scanning through the voltage from the open circuit voltage (OCV) to 0.5 volts against the reference electrode at 1 mV per second. The voltage of the cathode was measured with reference to the zinc electrode at various current densities with intermittent rest period. All the results are compared to a conventional cathode. FIG. 8 shows polarization curves for cathodes loaded with both heat-treated cryptomelane and nickel-exchanged cryptomelane in comparison to a conventional cathode. The half cell voltage is consistently higher for both cathodes loaded with cryptomelanes at voltages greater than 1.1 volts.

Figure 9:
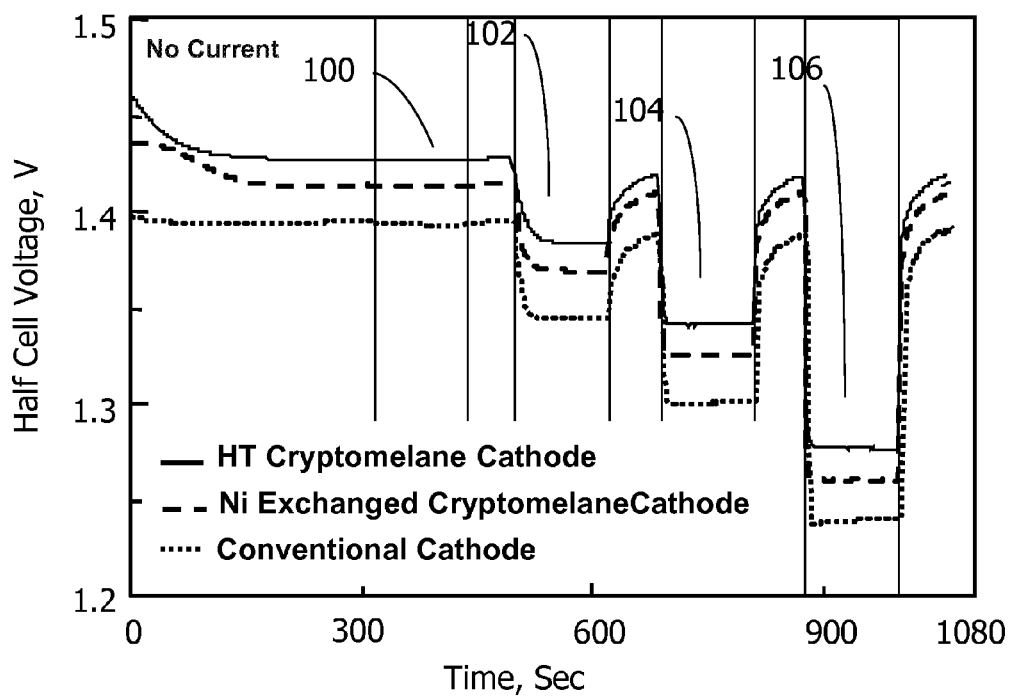
FIG. 9 shows discharge voltages of: ( ) a cathode loaded with Ni-exchanged cryptomelane, ( ) a cathode loaded with heat-treated cryptomelane in combination with catalytically active manganese oxide compounds, and ( ) a conventional cathode.

Referring to FIG. 9, it can be seen that the discharge voltages of the cathodes loaded with heat-treated cryptomelane and nickel-exchanged cryptomelane achieve consistently higher discharge voltages in comparison to the conventional cathode at current densities of 0.1 mA/cm³ (100 in FIG. 9), 5 mA/cm³ (102 in FIG. 9), 20 mA/cm³ (104 in FIG. 9), and 50 mA/cm³ (106 in FIG. 9). These data are summarized in TABLE 4 and show that the first cathode strip comprising heat-treated cryptomelane in combination with catalytically active manganese oxide compounds and the second cathode strip comprising nickel-exchanged cryptomelane catalyst exhibited discharge voltages increased by about 25 mV or more at various current densities.

TABLE 4

| Half Cell Voltages at Different Current Densities | | | | | |
|---|---|---|---|---|---|
| Current Density (mA/cm²) | OCV | 0.1 | 5 | 20 | 50 |
| Present Cathode | 1.394 V | 1.392 V | 1.344 V | 1.300 V | 1.239 V |
| Cathode loaded with Ni-exchanged Cryptomelane | 1.412 V | 1.411 V | 1.371 V | 1.326 V | 1.252 V |
| Cathode loaded with Heat-Treated Cryptomelane and Catalytically Active Manganese Oxide Compounds | 1.423 V | 1.421 V | 1.382 V | 1.334 V | 1.255 V |

Example 11

Figure 16:
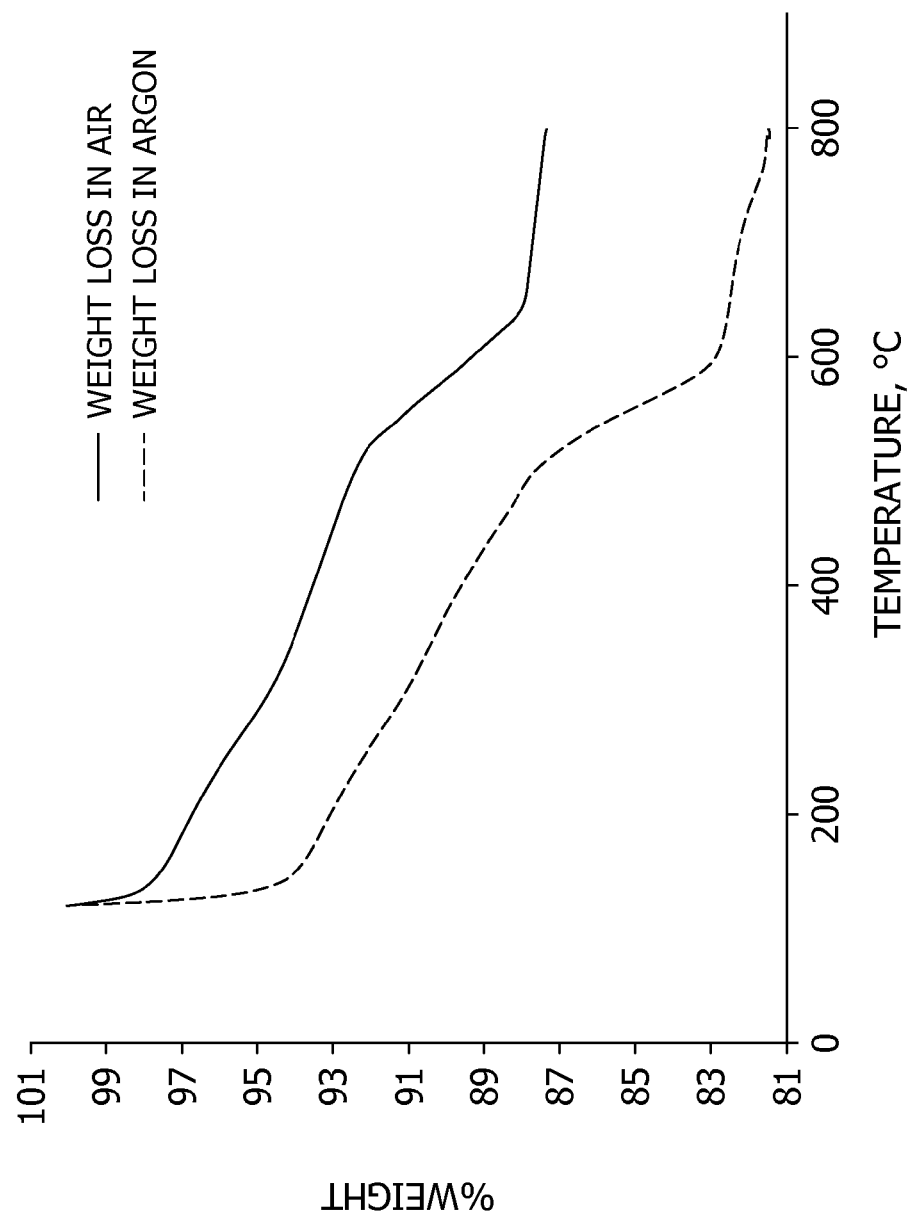
FIG. 16 displays the thermal gravimetric study of the manganese oxide having an octahedral molecular sieve structure (cryptomelane) in air and argon.
Figure 17:
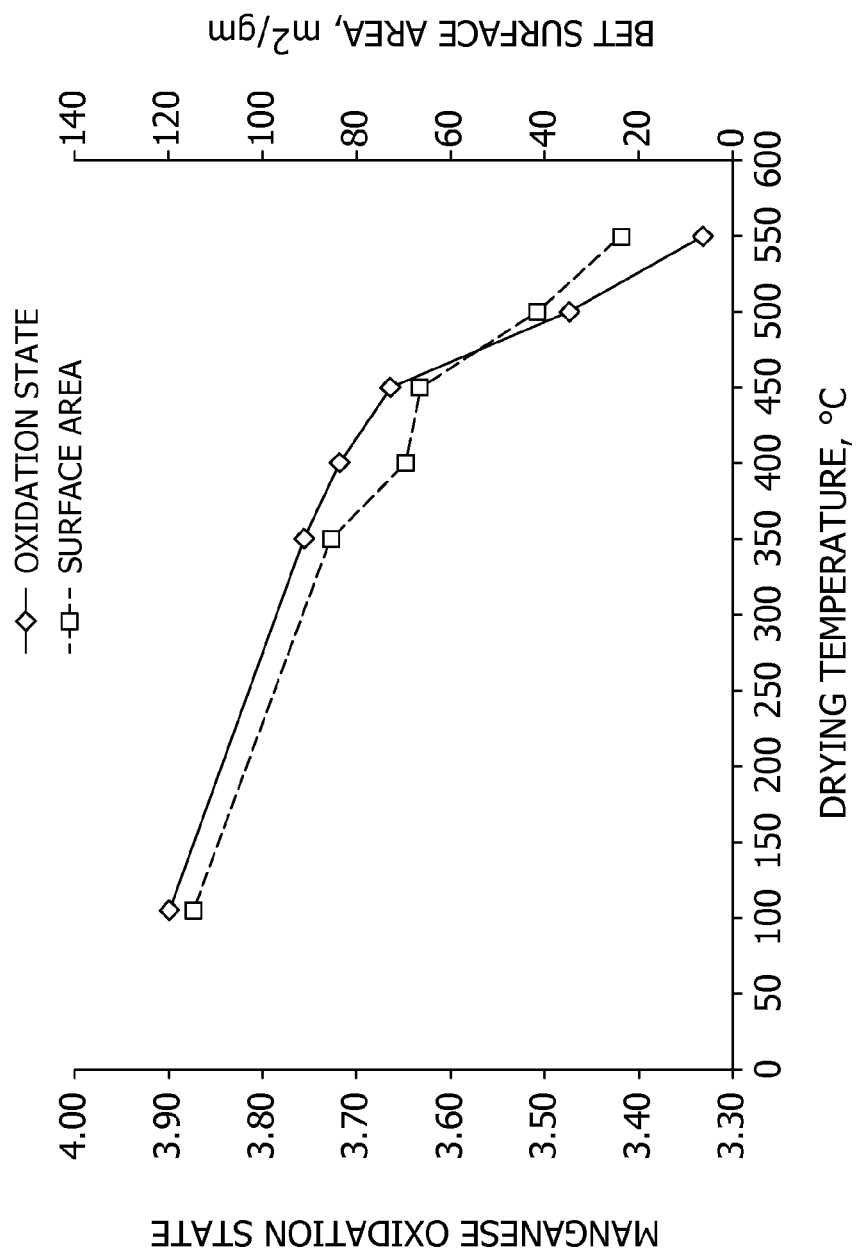
FIG. 17 displays the change in the manganese oxidation state and the surface area with heat treatment temperature.

Mixture of Manganese Oxides Having an Octahedral Molecular Sieve Structure and Bixbyite As noted above, the cryptomelane can be prepared by filtering, washing and drying solids obtained from the reaction of a $KMnO_4$ and $MnSO_4 \cdot H_2O$ solution at 70° C. FIG. 16 depicts thermogravimetric analysis (TGA) curves for cryptomelane in air as well as in argon. The cryptomelane samples were heated at 5° C./min. For the TGA curve in air, after the initial weight loss (that can be ascribed to loss of outbound water), the slope of the weight loss was almost constant from about 160° C. to about 520° C. The slope increased at the point where the weight loss became higher with the rise in temperature. The flattening of the curve then occurred at about 620° C., signaling a completion of the reaction. As shown in FIG. 16, the inflection points occurred at lower temperatures for the cryptomelane sample heated under argon.

The results of the samples of cryptomelane that were heated at temperatures between about 450° C. and about 600° C. are shown below. Specifically, the effects of temperature of calcination on the manganese oxidation state, the calculated chemical formula, the surface area and the particle size are represented in Table 5.

TABLE 5

| Calcination and/or Drying Temperature, ° C. | Oxidation State | Chemical Formula | BET Surface Area, m²/g | Mean Particle Size, μm |
|---|---|---|---|---|
| 120 | 3.90 | $K_{0.11}MnO_{2.00}$ | 114.6 | 1.731 |
| 350 | 3.76 | $K_{0.11}MnO_{1.93}$ | 85.4 | 1.655 |
| 400 | 3.72 | $K_{0.10}MnO_{1.92}$ | 76.41 | 1.739 |
| 450 | 3.66 | $K_{0.11}MnO_{1.89}$ | 66.3 | 1.730 |
| 500 | 3.47 | $K_{0.11}MnO_{1.79}$ | 45.07 | 1.801 |
| 550 | 3.33 | $K_{0.11}MnO_{1.72}$ | 28.06 | 1.839 |
| 600 | 3.18 | $K_{0.11}MnO_{1.64}$ | 20.07 | 1.901 |
| 650 | 3.17 | $K_{0.11}MnO_{1.64}$ | 16.68 | 1.995 |

As shown in Table 5, as the calcination temperature increases from about 450° C. to about 650° C., the manganese oxidation state and the B.E.T. surface area decrease, while the mean particle size increases.

Figure 10:
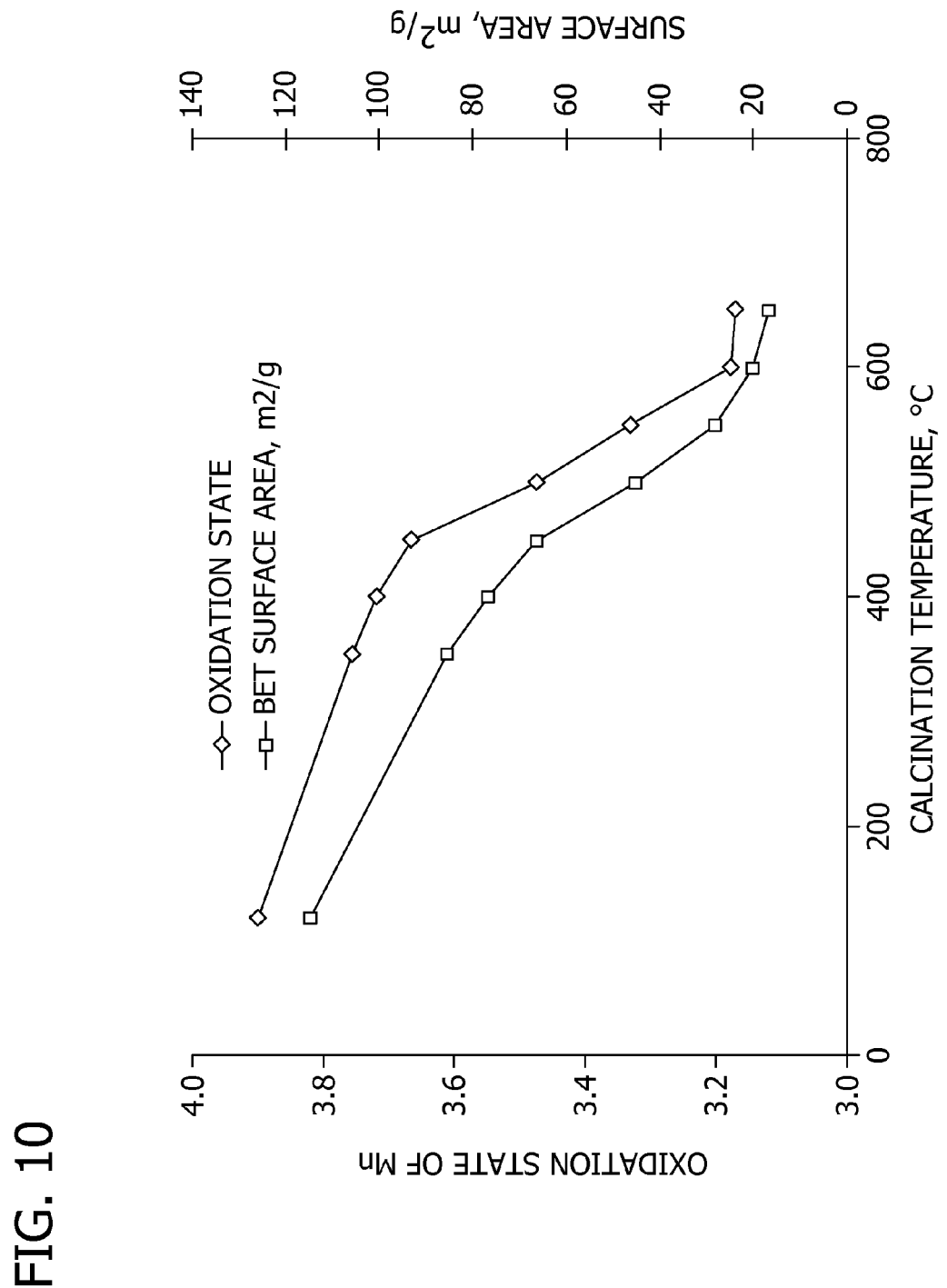
FIG. 10 displays the effect of temperature of calcination on the manganese oxidation state and the surface area of a catalyst.

Further, as shown in FIG. 10, the emergence of peaks for the Bixbyite ($Mn_2O_3$) phase occurs at about 500° C. and corresponds to the increase in slope of the manganese oxidation state versus the temperature plot. The growth of the peaks of the Bixbyite phase is observed for samples calcined at 550° C. and even more for the samples calcined at 600° C. This observation is consistent with the change in the slope of the thermal gravimetric analysis curve represented in FIG. 16 and the change in the oxidation state of manganese in the samples of FIG. 10.

From these results, it can be observed that the weight loss associated with the samples heated between 120° C. and 450° C. does not cause a change in the structure of the cryptomelane. Meanwhile, the decrease in the manganese oxidation state is evidence of the loss of oxygen from the structure of cryptomelane and the creation of oxygen vacancies. The Bixbyite phase is formed at about 500° C. and at temperatures above that. The partial phase transition of the cryptomelane with manganese ions having an oxidation state of 4 (i.e., $Mn^{+4}$ ions) to $Mn_2O_3$ having $Mn^{+3}$ ions is observed in the abrupt change in the manganese oxidation state shown in FIG. 10 at 500° C.

Figure 18:
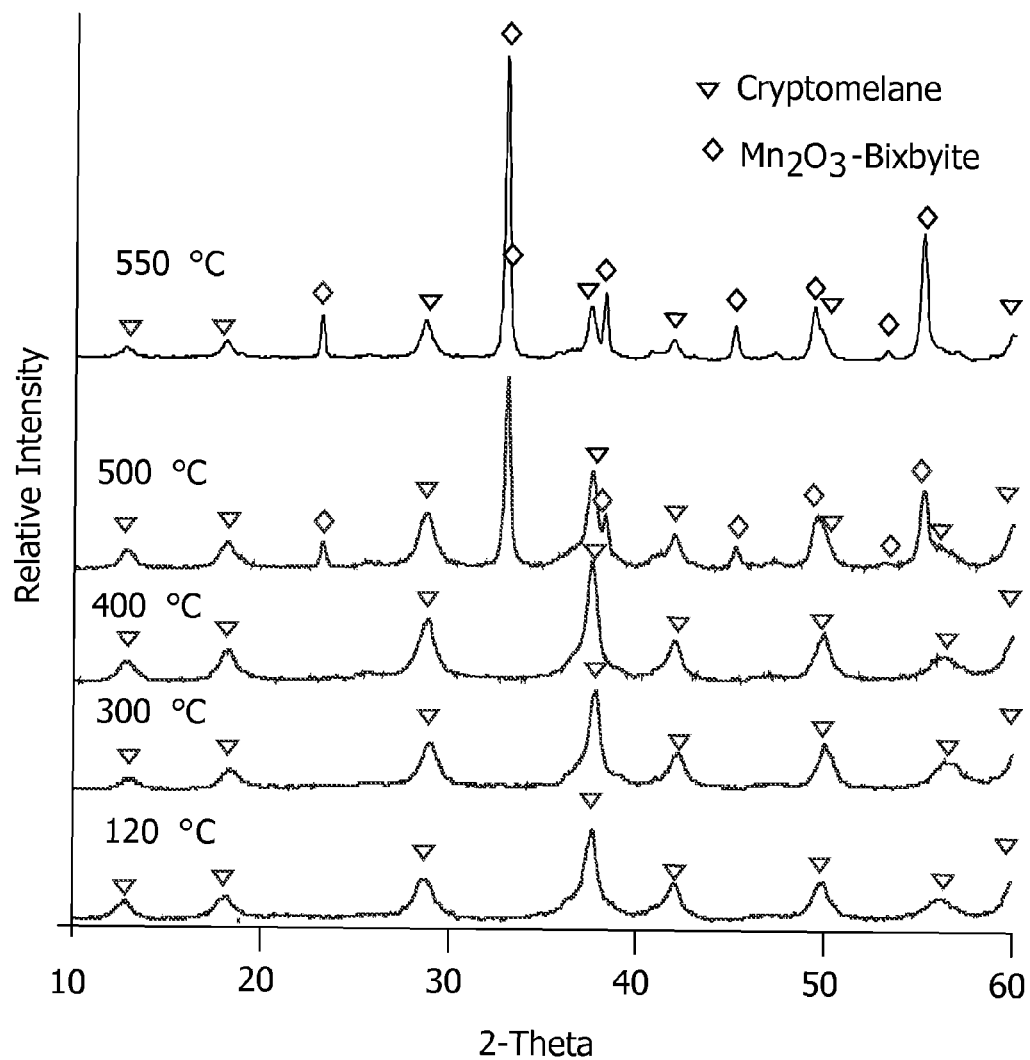
FIG. 18 displays the X-ray diffraction pattern of cryptomelane samples heated at 120° C., 300° C., 400° C., 500° C. and 550° C.

FIG. 18 depicts the powder X-ray diffraction patterns for the heat-treated samples. Again, there is little change in patterns for the samples treated at temperatures between about 120° C. and about 450° C. The emergence of peaks occurs for the Bixbyite ($Mn_2O_3$) phase at about 500° C. and grows at about 550° C. This observation is consistent with the change in slope of the TGA curves in FIG. 16 and the change in the manganese oxidation state in the samples.

Figure 11A:
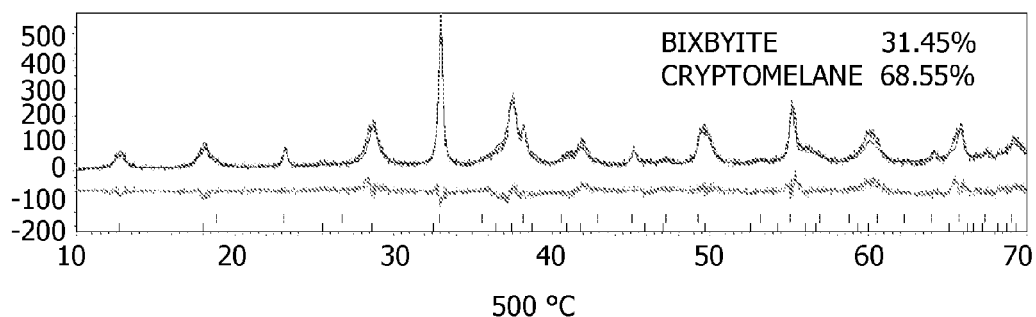
FIGS. 11A-11C depict the Rietveld analysis for X-ray diffraction data for samples calcined at 500° C., 550° C. and 600° C.
Figure 11B:
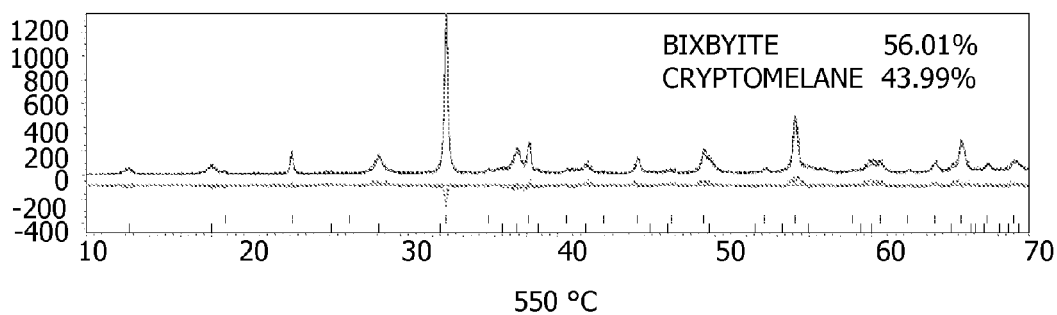
Figure 11C:
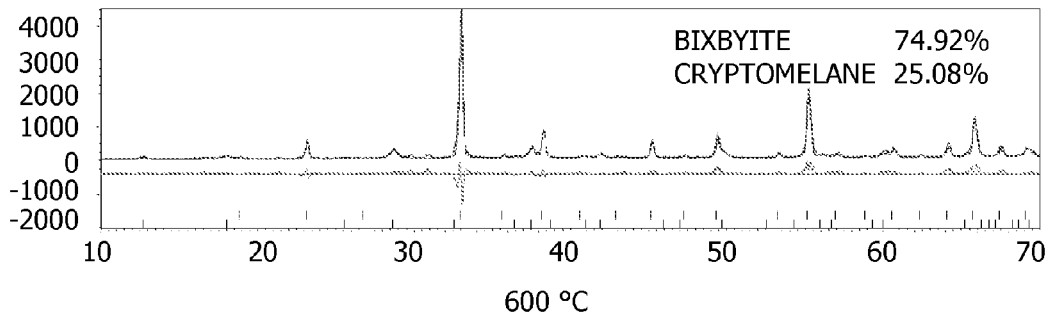

The amount of $Mn_2O_3$ phase present in the sample can be calculated both from chemical formula and by Rietveld analysis of the X-ray diffraction data. For example, FIG. 11A depicts the Rietveld analysis for the X-ray diffraction data for a sample calcined at 500° C. From this analysis, one having ordinary skill in the art can determine that the Bixbyite phase constitutes about 31% of the mixed catalyst, while the cryptomelane constitutes about 69% of the mixed catalyst. FIG. 11B shows that at 550° C., the Bixbyite phase constitutes about 56% of the mixed catalyst, while the cryptomelane constitutes about 44% of the mixed catalyst. FIG. 11C shows that at 600° C., the Bixbyite phase constitutes about 75% of the mixed catalyst, while the cryptomelane constitutes about 25% of the mixed catalyst.

The amount of Bixbyite ($Mn_2O_3$) phase in the mixed catalyst can also be calculated from the chemical formula calculated from the chemical analysis data, as indicated in Table 6.

TABLE 6

| Drying Temperature, ° C. | Chemical Formula | Composition by Reitveld Analysis | | Composition from Chemical Formula | |
|---|---|---|---|---|---|
| | | $KMn_8O_{16}$ | $Mn_2O_3$ | $KMn_8O_{16}$ | $Mn_2O_3$ |
| 105 | $K_{0.11}MnO_{2.00}$ | 100.0 | 0.0 | 100 | 0 |
| 350 | $K_{0.11}MnO_{1.93}$ | 100.0 | 0.0 | 100 | 0 |
| 400 | $K_{0.10}MnO_{1.92}$ | 100.0 | 0.0 | 100 | 0 |
| 450 | $K_{0.11}MnO_{1.89}$ | 100.0 | 0.0 | 100 | 0 |
| 500 | $K_{0.11}MnO_{1.79}$ | 68.6 | 31.5 | 70.1 | 29.9 |
| 550 | $K_{0.11}MnO_{1.72}$ | 56.0 | 44.0 | 49.3 | 50.7 |
| | | Composition by Reitveld Analysis | | Composition from Chemical Formula | |
| 600 | $K_{0.11}MnO_{1.64}$ | 25.2 | 74.8 | 26.6 | 73.4 |
| 650 | $K_{0.11}MnO_{1.64}$ | 23.5 | 76.5 | 25.4 | 74.6 |

Example 12

Electrochemical Performance of Mixed Catalysts

The mixed catalyst samples of Example 11 were mixed with activated carbon, conductive carbon and PTFE and rolled into gas-diffusion electrodes. The electrodes were then tested in a half-cell with zinc wire as the reference in 33% KOH solution containing 2% zinc oxide. The electrodes were discharged at 10 $mA/cm^2$ and the recovery of voltage was monitored under an open circuit. The discharge and recovery curves are depicted in FIG. 12.

Figure 12:
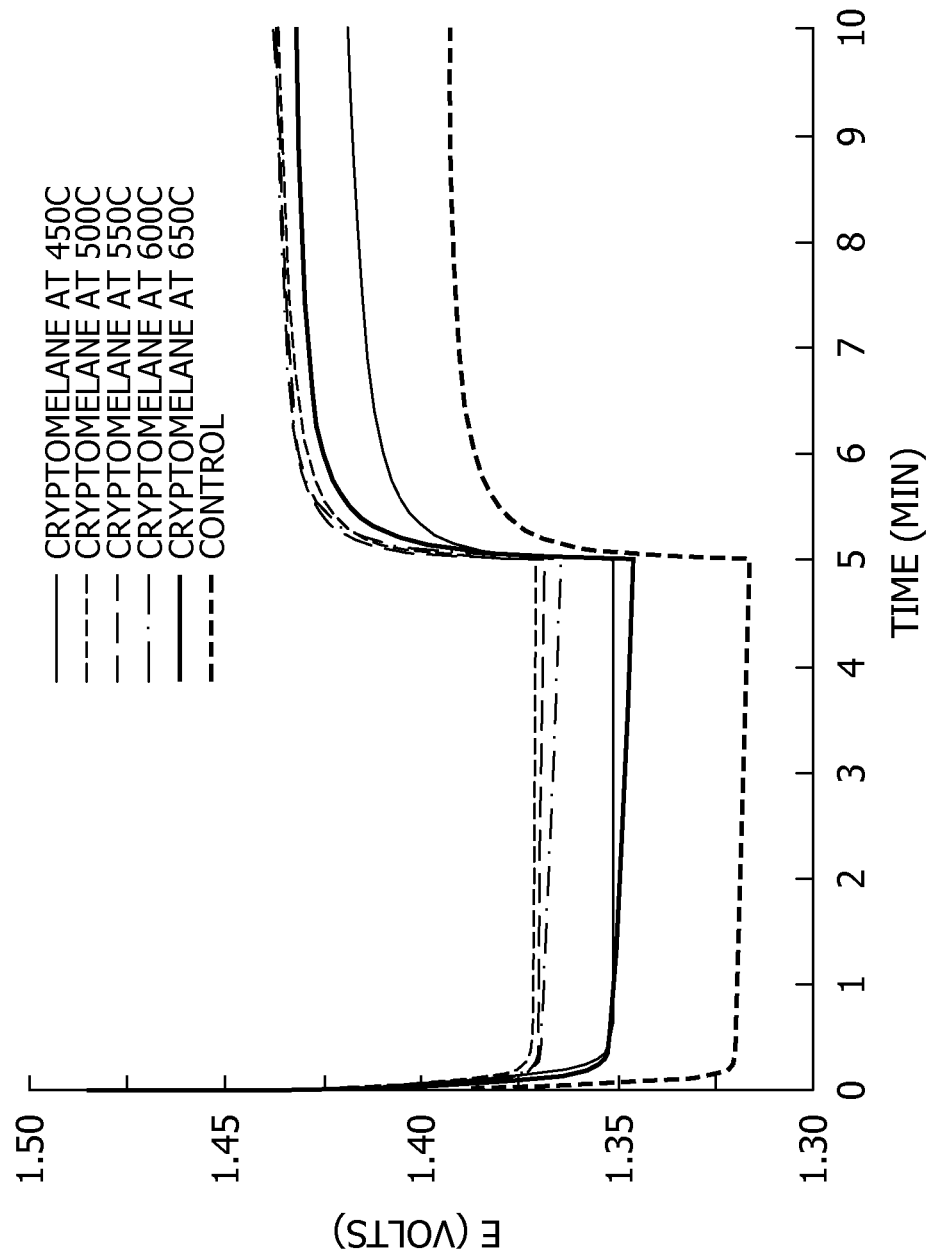
FIG. 12 displays the discharge and recovery curves for gas diffusion electrodes with catalysts made at 450° C., 500° C., 550° C., 600° C. and 650° C.

As is shown in FIG. 12, the samples calcined at 500° C., 550° C. and 600° C., respectively, performed the best under load. The samples made at 450° C. and 650° C. have lower voltage under load. Additionally, the recovery voltage of the 450° C. sample was lower than the other samples and the recovery voltage of the 650° C. sample was lower than the recovery voltage of the 500° C., 550° C. and 600° C. samples.

Figure 13:
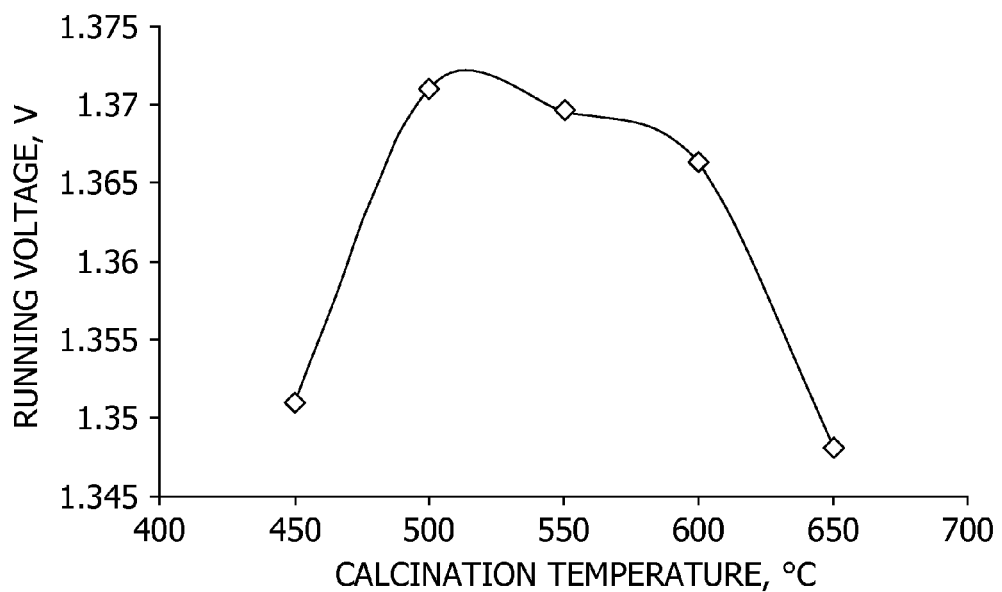
FIG. 13 displays the discharge voltages at 3 minutes at 10 mA/cm$^2$ for gas diffusion electrodes with catalysts made at 450° C., 500° C., 550° C., 600° C. and 650° C.
Figure 14:
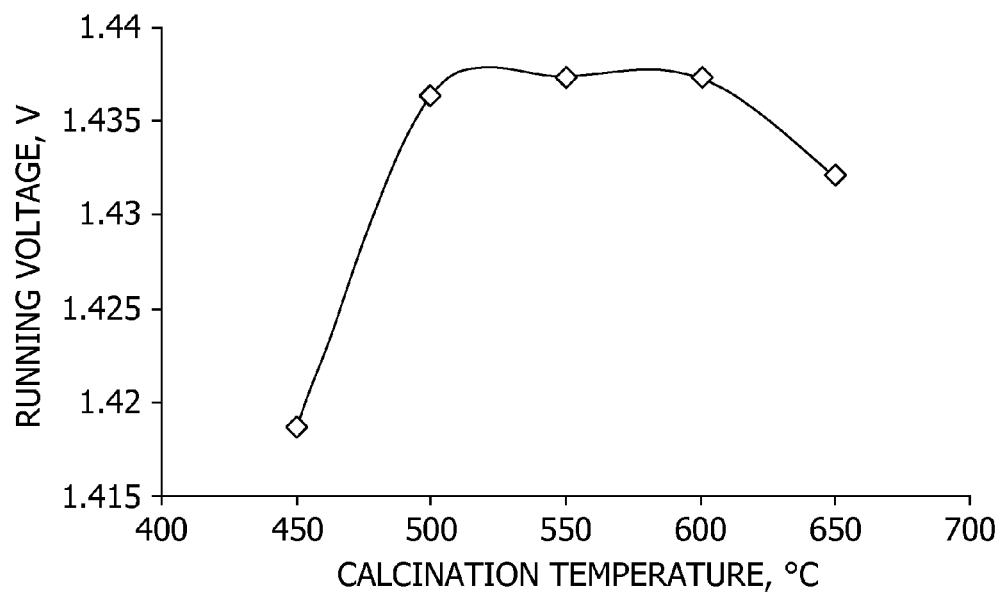
FIG. 14 displays the recovery voltages at 5 minutes into rest (offload) for gas diffusion electrodes with catalysts made at 450° C., 500° C., 550° C., 600° C. and 650° C.

FIG. 13 depicts the running voltage at three minutes into discharge and FIG. 14 depicts the recovery voltage at five minutes off load. As shown in FIGS. 13 and 14, respectively, the highest values for cell voltages were obtained for the 500° C., 550° C. and 600° C. samples.

Figure 15:
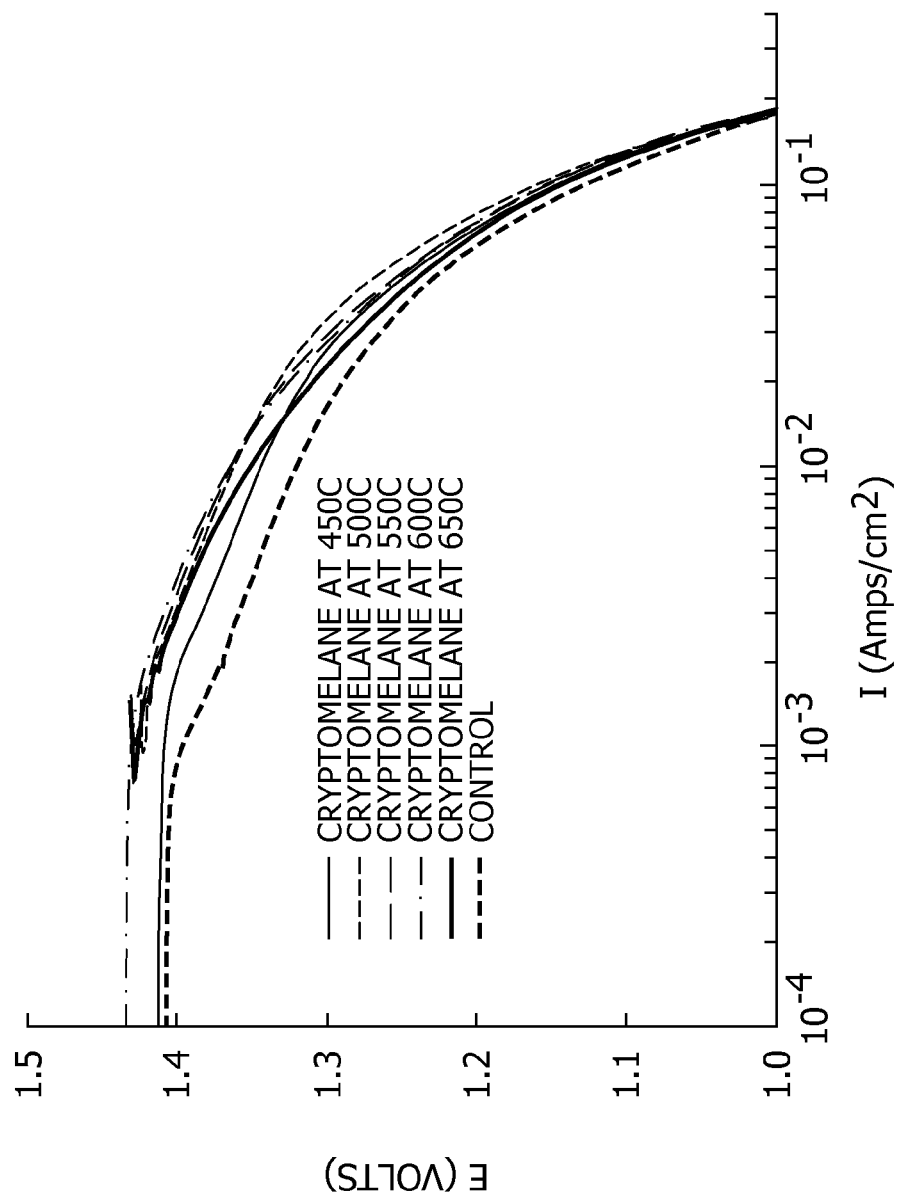
FIG. 15 displays the polarization curves for gas diffusion electrodes with catalysts made at 450° C., 500° C., 550° C., 600° C. and 650° C.

FIG. 15 depicts the polarization curves of the samples. The voltage was scanned at 1 mV/sec and the current was then measured. Similar to the discharge and the recovery samples, the best performance was obtained with samples calcined at 500° C., 550° C. and 600° C.

Figure 19:
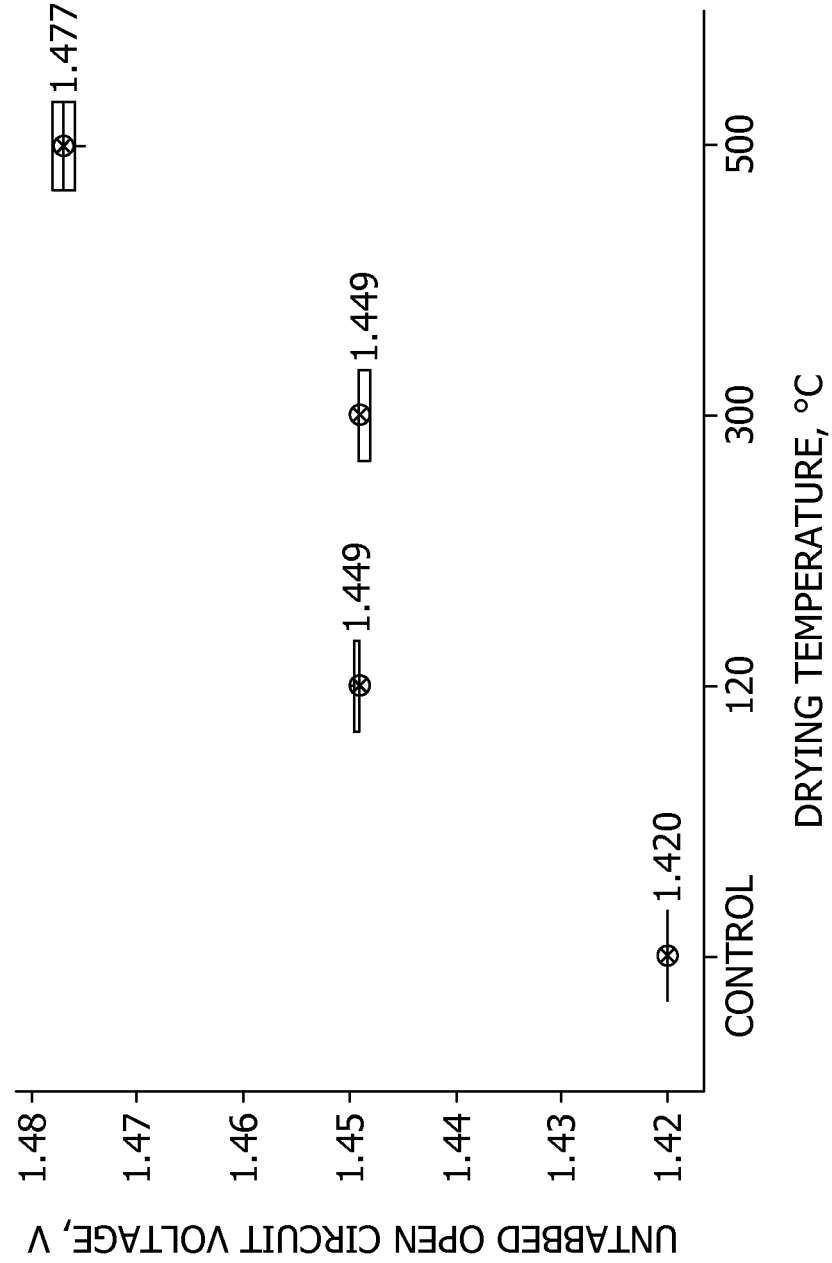
FIG. 19 displays the open circuit voltage of zinc air cells with cathodes comprising catalysts made at 120° C., 300° C. and 500° C.

FIGS. 19-22 depict the electrochemical performance of the samples tested in a full cell. FIG. 19 depicts the increase in open circuit voltage of the mixed catalyst calcined at 500° C. Specifically, FIG. 19 shows that the open circuit voltage of the mixed catalyst calcined at 500° C. was 28 mV higher than that of the pure cryptomelane catalyst made at 120° C. and 300° C., respectively. Furthermore, the mixed catalyst calcined at 500° C. had an open circuit voltage of about 57 mV more than the state of the art control cathode.

Figure 20:
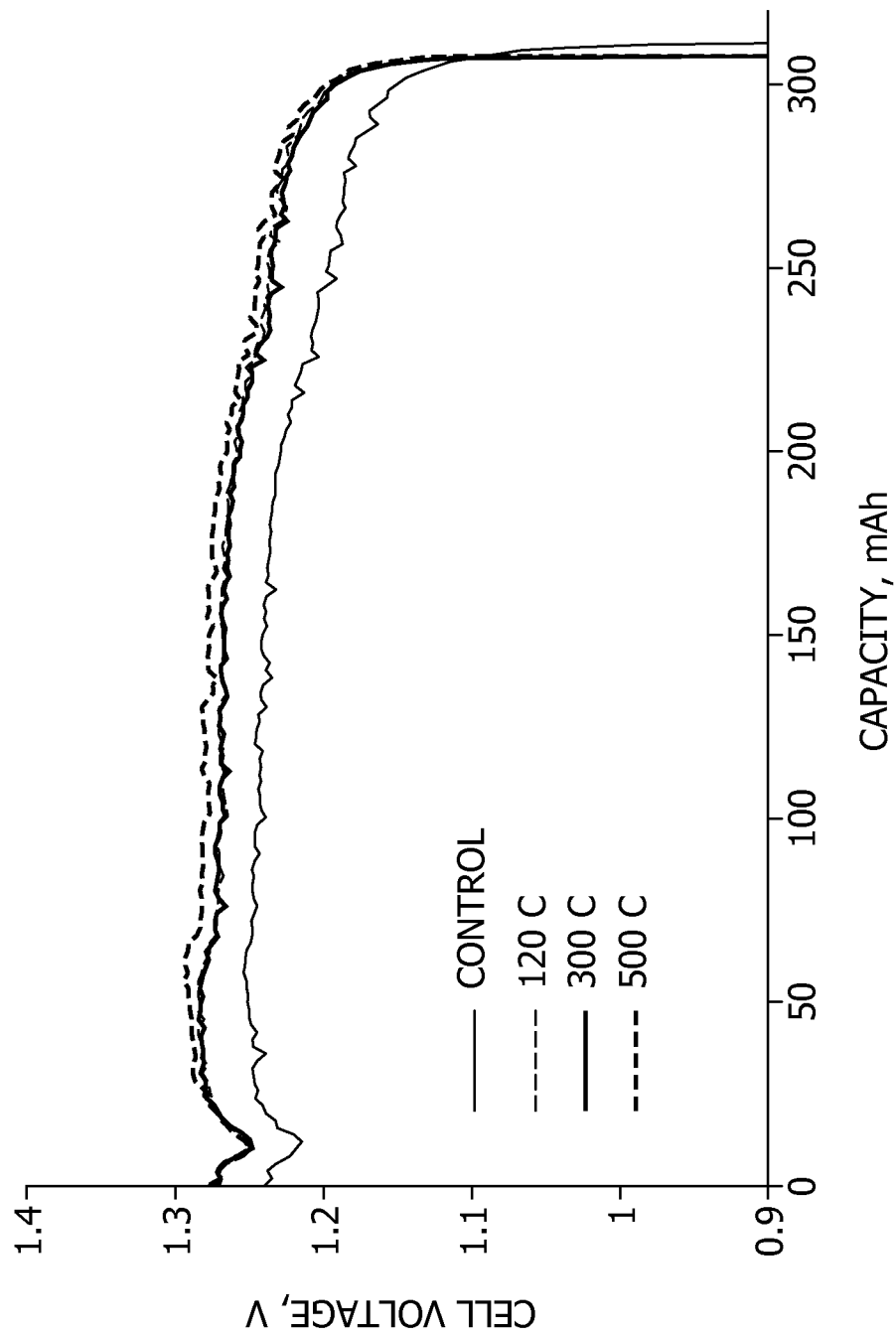
FIG. 20 displays 620 ohm constant load discharge curves for zinc air cells comprising cathodes made with catalysts made at 120° C., 300° C. and 500° C.
Figure 21:
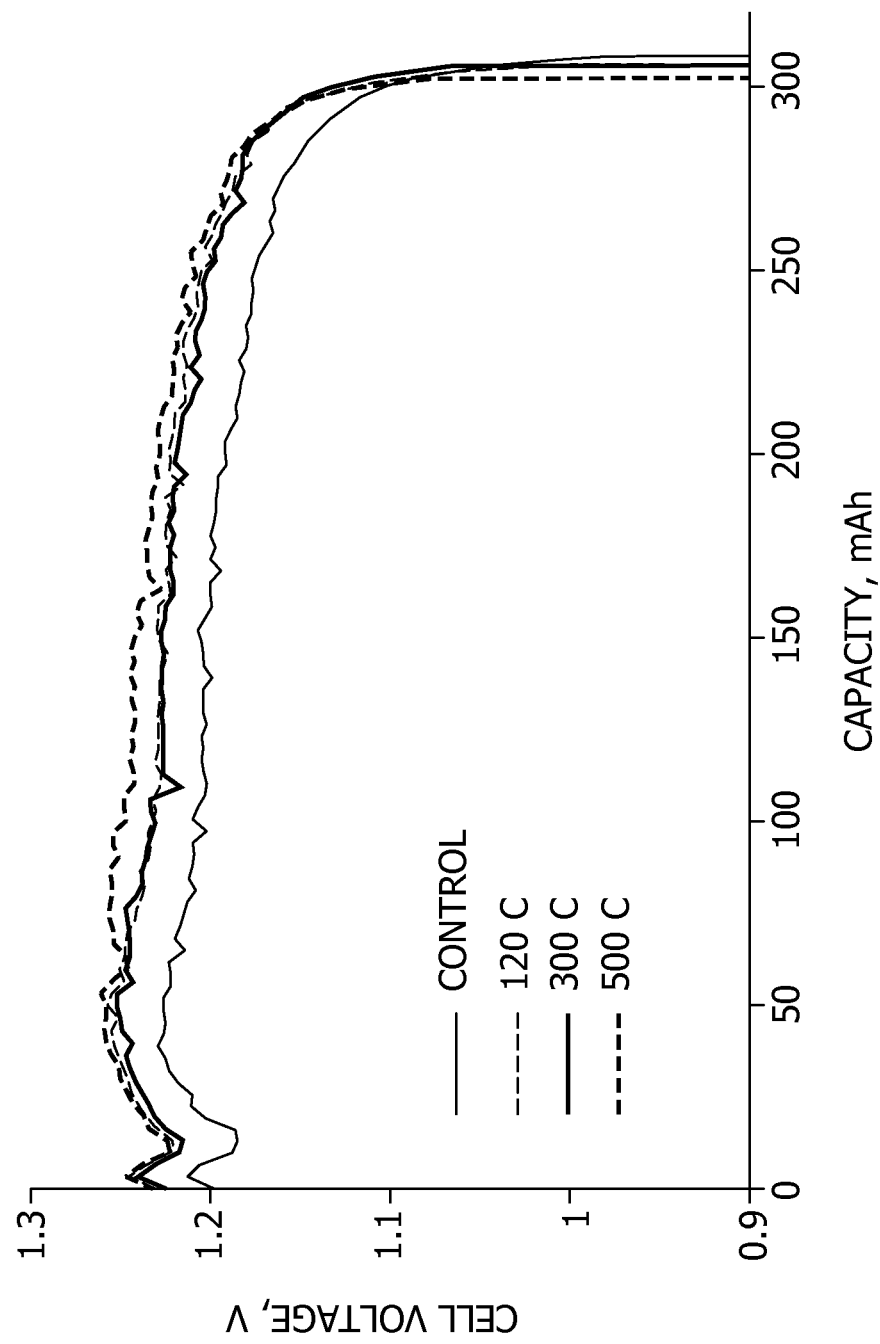
FIG. 21 displays 374 ohm constant load discharge curves for zinc air cells made with cathodes comprising catalysts made at 120° C., 300° C. and 500° C.

FIGS. 20 and 21 depict the higher discharge voltage for the cells comprising the mixed catalyst calcined at 500° C. than the pure cryptomelane catalysts made at 120° C. or 300° C. and a state of the art control cathode. The discharge curve in FIG. 20 is 620 ohm constant load and the discharge curve in FIG. 21 is 374 ohm constant load, with the cells being discharged at 50% relative humidity.

Figure 22:
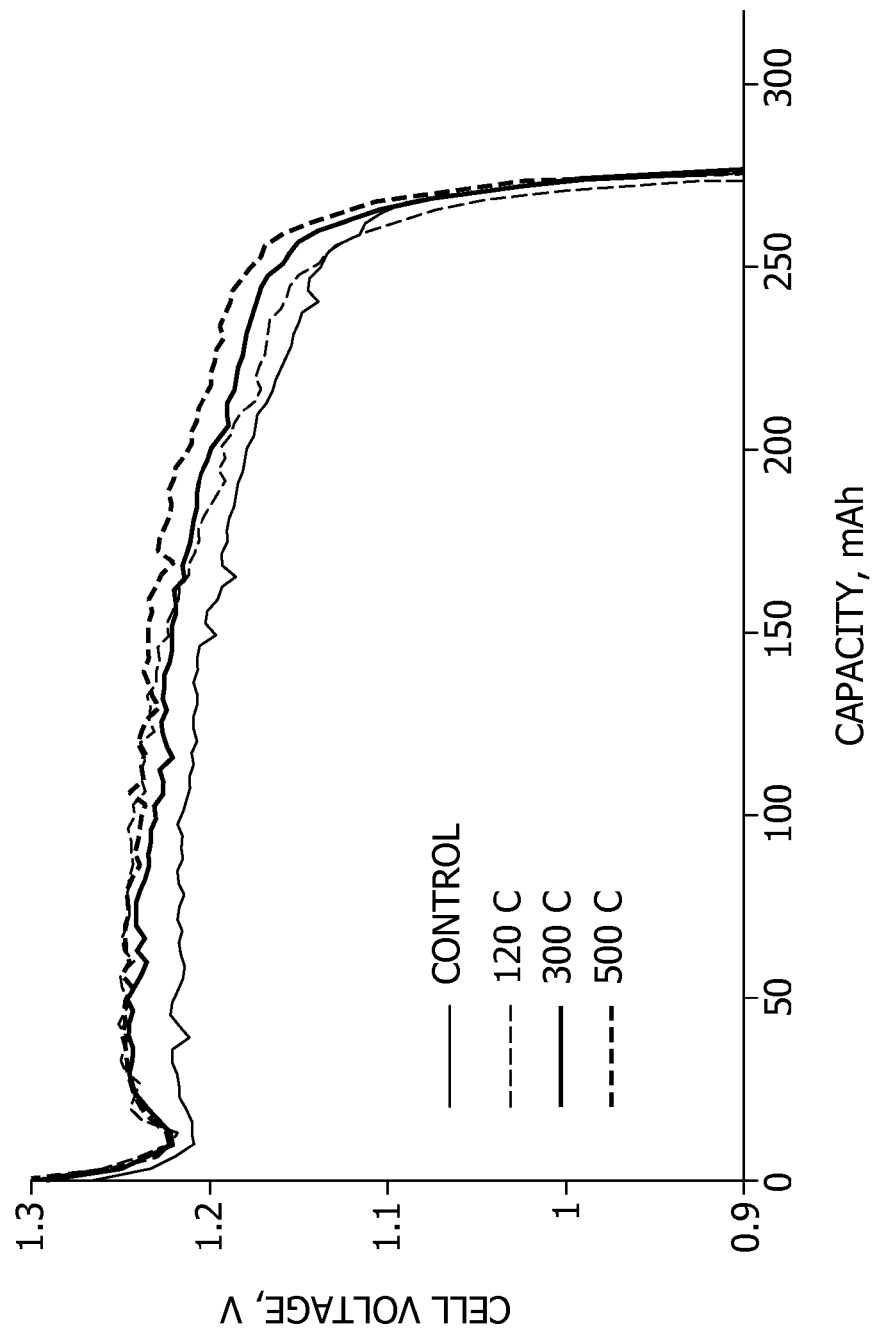
FIG. 22 displays 374 ohm constant load discharge curves for zinc air cells stored for 20 days at 60° C. with cathodes comprising catalysts made at 120° C., 300° C. and 500° C.

FIG. 22 depicts the discharge curves for the sample cells after they have been stored at 60° C. for twenty days. The storage time of twenty days at 60° C. represents approximately twelve months of storage time at room temperature on a shelf. FIG. 22 shows that the sample cells with the mixed catalyst made at 500° C. produced higher voltage for the full range of discharge than the cells with cathodes containing pure cryptomelane made at 120° C. or 300° C. It is also believed that the higher stability of the cathode or catalyst can be traced back to the surface area of the catalysts. For example, the mixed catalyst material made at 500° C. has a surface area of 41.5 $m^2/g$ while the pure cryptomelane catalyst made at 120° C. or 300° C. has surface areas of 114.6 $m^2/g$ and 85.4 $m^2/g$, respectively.

In view of the above, it will be seen that the several objects of the invention are achieved and other advantageous results attained.

When introducing elements of the present invention or the preferred embodiment(s) thereof, the articles "a", "an", "the", and "said" are intended to mean that there are one or more of the elements. The terms "comprising", "including", "containing", and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. An electrochemical cell comprising:
   an anode;
   an aqueous alkaline electrolytic solution; and
   an oxygen reduction electrode comprising a mixed manganese oxide catalyst comprising an octahedral molecular sieve structure and $Mn_2O_3$, wherein the octahedral molecular sieve structure and the $Mn_2O_3$ are present in the mixed catalyst in a ratio between about 1:1 and about 3:1.

2. An electrochemical cell as set forth in claim 1 wherein the manganese in the mixed catalyst has an average oxidation state of less than about 3.7.

3. An electrochemical cell as set forth in claim 2 wherein the manganese in the mixed catalyst has an average oxidation state between about 3.1 and 3.7.

4. An electrochemical cell as set forth in claim 3 wherein the manganese in the mixed catalyst has an average oxidation state of about 3.3.

5. An electrochemical cell as set forth in claim 1 wherein the mixed catalyst has been calcined at a temperature between about 450° C. and about 650° C.

6. An electrochemical cell as set forth in claim 5 wherein the mixed catalyst has been calcined at a temperature between about 500° C. and about 600° C.

7. An electrochemical cell as set forth in claim 6 wherein the mixed catalyst has been calcined at a temperature of about 550° C.

8. An electrochemical cell as set forth in claim 1 wherein the octahedral molecular sieve structure and the $Mn_2O_3$ are present in the mixed catalyst in a ratio of between about 1.27:1 and about 1:1.

9. An electrochemical cell as set forth in claim 8 wherein the octahedral molecular sieve structure and the $Mn_2O_3$ are present in the mixed catalyst in a ratio of about 1:1.

10. An electrochemical cell as set forth in claim 1 wherein the manganese oxide contained in the mixed catalyst comprises particles having a B.E.T. surface area between about 10 $m^2/g$ and about 100 $m^2/g$.

11. An electrochemical cell as set forth in claim 10 wherein the manganese oxide contained in the mixed catalyst comprises particles having a B.E.T. surface area between about 15 $m^2/g$ and about 90 $m^2/g$.

12. An electrochemical cell as set forth in claim 1 wherein the manganese oxide contained in the mixed catalyst comprises particles having a mean particle size between about 0.5 µm and about 2.0 µm.

13. An electrochemical cell as set forth in claim 12 wherein the manganese oxide contained in the mixed catalyst comprises particles having a mean particle size between about 1.5 µm and 2.0 µm.

14. An electrochemical cell comprising:
   an anode;
   an aqueous alkaline electrolytic solution; and
   an oxygen reduction electrode comprising a mixed manganese oxide catalyst comprising an octahedral molecular sieve structure and $Mn_2O_3$, wherein the manganese in the mixed catalyst has an average oxidation state between about 3.2 and 3.6.

15. An electrochemical cell as set forth in claim 14 wherein the mixed catalyst has been calcined at a temperature between about 450° C. and about 650° C.

16. An electrochemical cell as set forth in claim 14 wherein the manganese in the mixed catalyst has an average oxidation state between about 3.25 and 3.5.

17. An electrochemical cell as set forth in claim 16 wherein the manganese in the mixed catalyst has an average oxidation state of about 3.3.

* * * * *